(12) United States Patent
Fujiki et al.

(10) Patent No.: US 8,962,189 B2
(45) Date of Patent: Feb. 24, 2015

(54) SECONDARY BATTERY, BATTERY PACK, ELECTRIC VEHICLE, ELECTRIC POWER STORAGE SYSTEM, ELECTRIC POWER TOOL, AND ELECTRONIC DEVICE

(75) Inventors: Satoshi Fujiki, Fukushima (JP);
Hirotaka Fukudome, Fukushima (JP);
Kazunari Motohashi, Fukushima (JP);
Yosuke Hosoya, Fukushima (JP);
Yoshihiro Kudo, Tokyo (JP)

(73) Assignee: Sony Corporation, Tokyo (JP)

( * ) Notice: Subject to any disclaimer, the term of this patent is extended or adjusted under 35 U.S.C. 154(b) by 367 days.

(21) Appl. No.: 13/584,436

(22) Filed: Aug. 13, 2012

(65) Prior Publication Data

US 2013/0052534 A1    Feb. 28, 2013

(30) Foreign Application Priority Data

Aug. 29, 2011    (JP) ................. 2011-186354

(51) Int. Cl.
*H01M 4/13*     (2010.01)
*H01M 4/58*     (2010.01)
*H01M 4/36*     (2006.01)
*H01M 4/505*    (2010.01)
*H01M 4/525*    (2010.01)

(52) U.S. Cl.
CPC .............. *H01M 4/366* (2013.01); *H01M 4/505* (2013.01); *H01M 4/525* (2013.01); *H01M 4/5805* (2013.01); *Y02E 60/122* (2013.01)
USPC ................. 429/231.95; 429/231.6; 429/231.9

(58) Field of Classification Search
CPC ........................... H01M 4/525; H01M 4/5805
USPC .............................. 429/231.95, 231.9, 231.6
See application file for complete search history.

(56) References Cited

FOREIGN PATENT DOCUMENTS

| JP | 2004-327309 | 11/2004 |
|---|---|---|
| JP | 2009-054583 | 3/2009 |
| WO | 2006/123572 | 11/2006 |

*Primary Examiner* — Helen O Conely
(74) *Attorney, Agent, or Firm* — K&L Gates LLP

(57) ABSTRACT

A cathode includes a lithium transition metal complex compound including lithium, one, or two or more transition metals, magnesium, and oxygen as constituent elements. In a standardized X-ray absorption spectrum of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, and a second absorption edge having absorption edge energy E2 in X-ray absorption intensity of about 0.5 exits, in a charged state in which a charge voltage V is from about 4.3 V to about 4.5 V both inclusive. The absorption edge energies E1 and E2 and the charge voltage V satisfy a relation of $E2-E1 \geq (V-4.25) \times 4$.

15 Claims, 6 Drawing Sheets

SECONDARY BATTERY, BATTERY PACK, ELECTRIC VEHICLE, ELECTRIC POWER STORAGE SYSTEM, ELECTRIC POWER TOOL, AND ELECTRONIC DEVICE

CROSS REFERENCES TO RELATED APPLICATIONS

The present application claims priority to Japanese Priority Patent Application JP 2011-186354 filed in the Japan Patent Office on Aug. 29, 2011, the entire content of which is hereby incorporated by reference.

BACKGROUND

The present application relates to a secondary battery in which a cathode contains a lithium transition metal complex compound, a battery pack using the secondary battery, an electric vehicle using the secondary battery, an electric power storage system using the secondary battery, an electric power tool using the secondary battery, and an electronic device using the secondary battery.

In recent years, various electronic devices such as a mobile phone and a personal digital assistant (PDA) have been widely used, and it has been strongly demanded to further reduce their size and weight and to achieve their long life. Accordingly, as an electric power source for the electronic devices, a battery, in particular, a small and light-weight secondary battery capable of providing high energy density has been developed. In these days, it has been considered to apply such a secondary battery to various applications in addition to the foregoing electronic devices. Examples of the various applications include a battery pack attachably and detachably loaded on the electronic devices or the like, an electric vehicle such as an electric automobile, an electric power storage system such as a home electric power server, and an electric drill.

As the secondary battery, secondary batteries using various charge and discharge principles have been widely proposed. Specially, a secondary battery using insertion and extraction of an electrode reactant is considered promising, since such a secondary battery provides higher energy density than lead batteries, nickel cadmium batteries, and the like.

The secondary battery includes a cathode, an anode, and an electrolytic solution. The cathode and the anode are layered with a separator in between. The cathode contains a cathode active material capable of inserting and extracting an electrode reactant and other material such as a cathode binder. As the cathode active material, in general, a lithium transition metal complex oxide such as $LiCoO_2$ is used.

A composition of the cathode active material which is a supply source of the electrode reactant largely affects performance of a secondary battery. Therefore, several proposals on the composition of the cathode active material have been made. Specifically, in order to obtain superior battery characteristics even in a severe usage environment, Mg exists at a predetermined ratio on the particle surface of a spinel-type lithium transition metal complex oxide (for example, see Japanese Unexamined Patent Application Publication No. 2004-327309). In order to obtain a high capacity and improve low temperature characteristics and the like, covering elements including P, Ni, and the like are provided on the particle surface of a lithium transition metal complex oxide (for example, see International Application Publication WO2006/123572). In order to obtain a high capacity and superior cycle characteristics and to suppress gas generation at the time of high temperature, a covering layer containing element M which is one of Group 2 to Group 13 elements and element X such as P is provided on the particle surface of a lithium transition metal complex oxide (for example, see Japanese Unexamined Patent Application Publication No. 2009-054583).

SUMMARY

As a cathode active material, the lithium transition metal complex oxide such as $LiCoO_2$ is widely used. However, the stability in a charged state of the cathode active material is not sufficient yet. Specifically, since reactivity of the cathode active material to the electrolytic solution is high, the cathode active material is deteriorated due to elution of the transition metal. In this case, the electrolytic solution, the separator, the cathode binder, and the like may be deteriorated in addition to the cathode active material. Further, since the transition metal eluted from the cathode is precipitated on the anode, at the time of charge and discharge, insertion and extraction of the electrode reactant is inhibited, and a decomposition reaction of the electrolytic solution is promoted. Therefore, battery characteristics of the secondary battery are easily lowered. Such a disadvantage is significant particularly in the case where a charge voltage is increased in order to improve energy density.

It is desirable to provide a secondary battery capable of providing superior battery characteristics, a battery pack, an electric vehicle, an electric power storage system, an electric power tool, and an electronic device.

According to an embodiment of the present application, there is provided a secondary battery including: a cathode; an anode; and an electrolytic solution. The cathode includes a lithium transition metal complex compound including lithium (Li), one, or two or more transition metals, magnesium (Mg), and oxygen (O) as constituent elements. In a standardized X-ray absorption spectrum, having a horizontal axis indicating X-ray energy (eV) and a vertical axis indicating X-ray absorption intensity, of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, and a second absorption edge having absorption edge energy E2 in X-ray absorption intensity of about 0.5 exits, in a charged state in which a charge voltage V is from about 4.3 V to about 4.5 V both inclusive. The absorption edge energies E1 and E2 and the charge voltage V satisfy a relation of $E2-E1 \geq (V-4.25) \times 4$.

According to an embodiment of the present application, there is provided a battery pack including: a secondary battery; a control section controlling a usage state of the secondary battery; and a switch section switching the usage state of the secondary battery according to an instruction of the control section. The secondary battery includes a cathode, an anode, and an electrolytic solution. The cathode includes a lithium transition metal complex compound including lithium (Li), one, or two or more transition metals, magnesium (Mg), and oxygen (O) as constituent elements. Tn a standardized X-ray absorption spectrum, having a horizontal axis indicating X-ray energy (eV) and a vertical axis indicating X-ray absorption intensity, of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, and a second absorption edge having absorption edge energy E2 in X-ray absorption intensity of about 0.5 exits, in a charged state in which a charge voltage V is from about 4.3 V to about 4.5 V both inclusive. The absorption edge energies E1 and E2 and the charge voltage V satisfy a relation of $E2-E1 \geq (V-4.25) \times 4$.

According to an embodiment of the present application, there is provided an electric vehicle including: a secondary battery; a conversion section converting electric power supplied from the secondary battery to drive power; a drive section operating according to the drive power; and a control section controlling a usage state of the secondary battery. The secondary battery includes a cathode, an anode, and an electrolytic solution. The cathode includes a lithium transition metal complex compound including lithium (Li), one, or two or more transition metals, magnesium (Mg), and oxygen (O) as constituent elements. In a standardized X-ray absorption spectrum, having a horizontal axis indicating X-ray energy (eV) and a vertical axis indicating X-ray absorption intensity, of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, and a second absorption edge having absorption edge energy E2 in X-ray absorption intensity of about 0.5 exits, in a charged state in which a charge voltage V is from about 4.3 V to about 4.5 V both inclusive. The absorption edge energies E1 and E2 and the charge voltage V satisfy a relation of $E2-E1 \geq (V-4.25) \times 4$.

According to an embodiment of the present application, there is provided an electric power storage system including: a secondary battery; one, or two or more electric devices; and a control section controlling supplying of electric power from the secondary battery to the electric device. The secondary battery includes a cathode, an anode, and an electrolytic solution. The cathode includes a lithium transition metal complex compound including lithium (Li), one, or two or more transition metals, magnesium (Mg), and oxygen (O) as constituent elements. In a standardized X-ray absorption spectrum, having a horizontal axis indicating X-ray energy (eV) and a vertical axis indicating X-ray absorption intensity, of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, and a second absorption edge having absorption edge energy E2 in X-ray absorption intensity of about 0.5 exits, in a charged state in which a charge voltage V is from about 4.3 V to about 4.5 V both inclusive. The absorption edge energies E1 and E2 and the charge voltage V satisfy a relation of $E2-E1 \geq (V-4.25) \times 4$.

According to an embodiment of the present application, there is provided an electric power tool including: a secondary battery; and a movable section being supplied with electric power from the secondary battery. The secondary battery includes a cathode, an anode, and an electrolytic solution. The cathode includes a lithium transition metal complex compound including lithium (Li), one, or two or more transition metals, magnesium (Mg), and oxygen (O) as constituent elements. In a standardized X-ray absorption spectrum, having a horizontal axis indicating X-ray energy (eV) and a vertical axis indicating X-ray absorption intensity, of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, a second absorption edge having absorption edge energy E2 in X-ray absorption intensity of about 0.5 exits, in a charged state in which a charge voltage V is from about 4.3 V to about 4.5 V both inclusive. The absorption edge energies E1 and E2 and the charge voltage V satisfy a relation of $E2-E1 \geq (V-4.25) \times 4$.

According to an embodiment of the present application, there is provided an electronic device including a secondary battery as an electric power supply source. The secondary battery includes a cathode, an anode, and an electrolytic solution. The cathode includes a lithium transition metal complex compound including lithium (Li), one, or two or more transition metals, magnesium (Mg), and oxygen (O) as constituent elements. In a standardized X-ray absorption spectrum, having a horizontal axis indicating X-ray energy (eV) and a vertical axis indicating X-ray absorption intensity, of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, a second absorption edge having absorption edge energy E2 in X-ray absorption intensity of about 0.5 exits, in a charged state in which a charge voltage V is from about 4.3 V to about 4.5 V both inclusive. The absorption edge energies E1 and E2 and the charge voltage V satisfy a relation of $E2-E1 \geq (V-4.25) \times 4$.

The X-ray absorption spectrum herein mentioned is what we call an X-ray absorption fine structure (XAFS) spectrum. "Standardized X-ray absorption spectrum" is an X-ray absorption spectrum in which the spectrum intensity (absorption intensity) is standardized by a predetermined procedure in order to secure reproducibility and reliability in determining the absorption edge energies E1 and E2. For details of the standardization of the X-ray absorption spectrum, a description will be given later.

According to the secondary battery according to the embodiment of the present application, since the cathode active material of the cathode contains the lithium transition metal complex compound containing magnesium as a constituent element, and the lithium transition metal complex compound satisfies the foregoing conditions, superior battery characteristics are thereby obtained. Further, according to the battery pack, the electric vehicle, the electric power storage system, the electric power tool, and the electronic device according to the embodiments of the present application, similar effects are obtained.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

DETAILED DESCRIPTION

Embodiments of the present application will be hereinafter described in detail with reference to the drawings. The description will be given in the following order.
1. Secondary Battery
  1-1. Cylindrical Type
  1-2. Laminated Film Type
2. Applications of Secondary Battery
  2-1. Battery Pack
  2-2. Electric Vehicle
  2-3. Electric Power Storage System
  2-4. Electric Power Tool
[1. Secondary Battery/1-1. Cylindrical Type]

Figure 1:
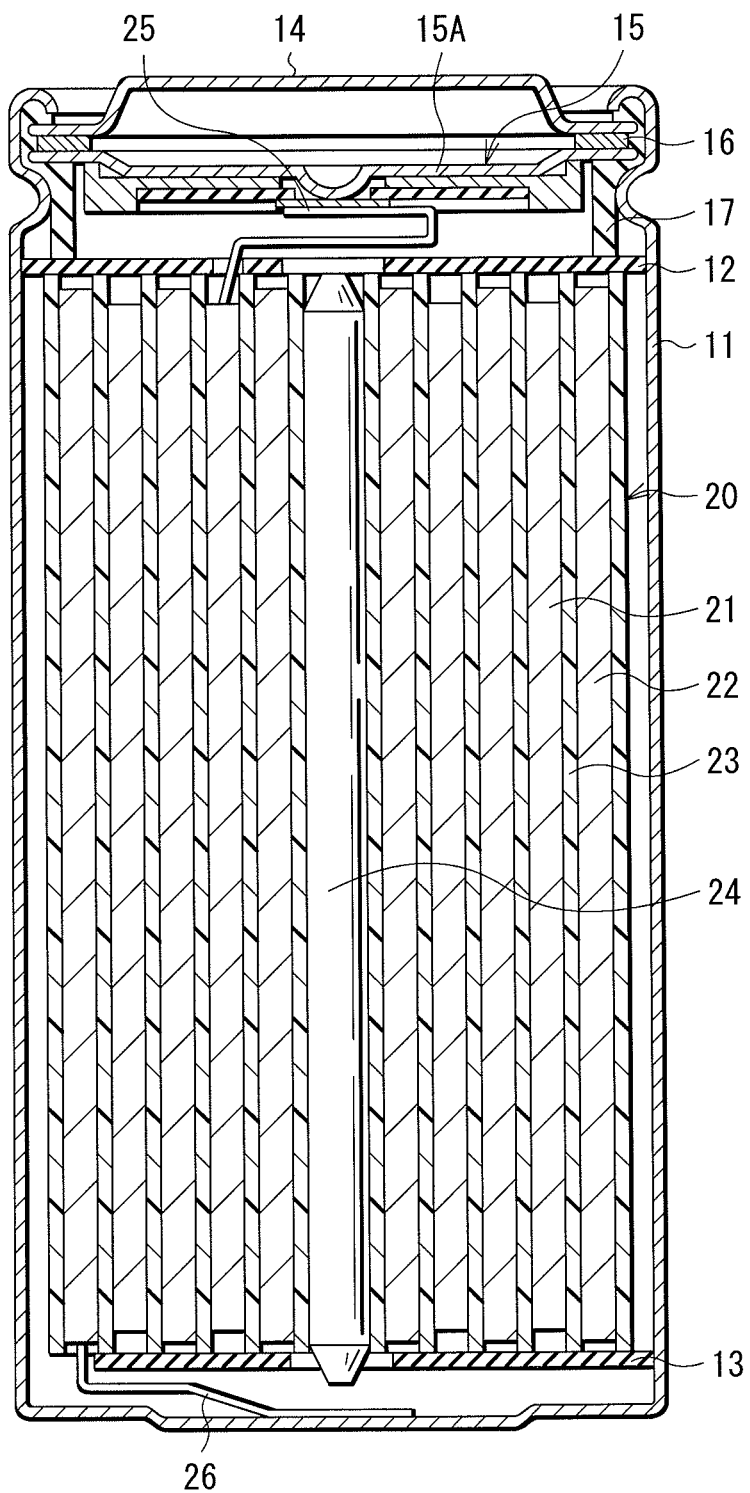
FIG. 1 is a cross-sectional view illustrating a configuration of a secondary battery (cylindrical type) according to an embodiment of the present application.
Figure 2:
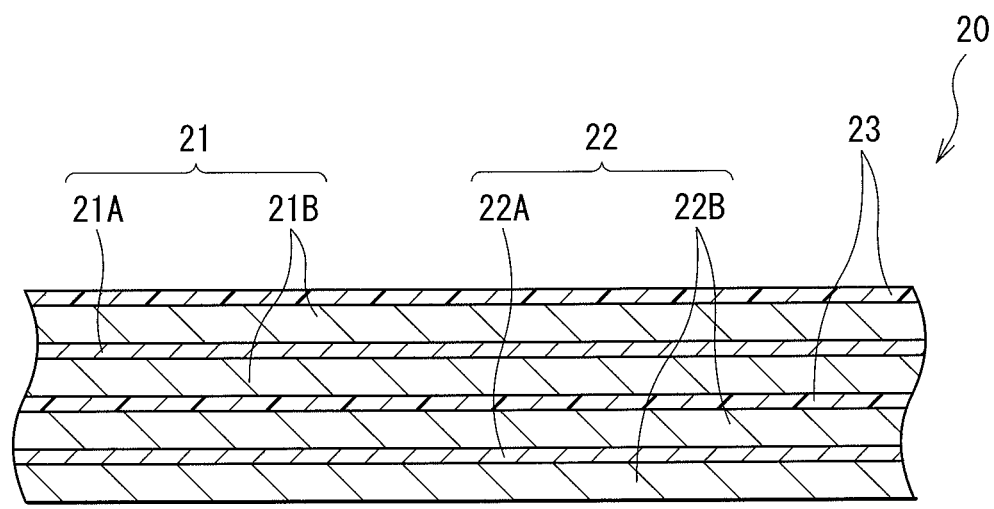
FIG. 2 is a cross-sectional view illustrating an enlarged part of a spirally wound electrode body illustrated in FIG. 1.

FIG. 1 and FIG. 2 illustrate cross-sectional configurations of a secondary battery according to an embodiment of the present application. FIG. 2 illustrates enlarged part of a spirally wound electrode body 20 illustrated in FIG. 1.

[Whole Configuration of Secondary Battery]

The secondary battery is, for example, a lithium ion secondary battery in which its battery capacity is obtained by insertion and extraction of lithium ions as an electrode reactant (hereinafter simply referred to as "secondary battery").

The secondary battery herein described is, what we call a cylindrical type secondary battery. The secondary battery contains the spirally wound electrode body 20 and a pair of insulating plates 12 and 13 inside a battery can 11 in the shape of a substantially hollow cylinder. In the spirally wound electrode body 20, for example, a cathode 21 and an anode 22 are layered with a separator 23 in between and are spirally wound.

The battery can 11 has a hollow structure in which one end of the battery can 11 is closed and the other end of the battery can 11 is opened. The battery can 11 is made of, for example, Fe, Al, an alloy thereof, or the like. The surface of the battery can 11 may be plated with Ni or the like. The pair of insulating plates 12 and 13 is arranged to sandwich the spirally wound electrode body 20 in between, and to extend perpendicularly to the spirally wound periphery surface.

At the open end of the battery can 11, a battery cover 14, a safety valve mechanism 15, and a PTC (Positive Temperature Coefficient) device 16 are attached by being swaged with a gasket 17. Thereby, the battery can 11 is hermetically sealed. The battery cover 14 is made of, for example, a material similar to that of the battery can 11. The safety valve mechanism 15 and the PTC device 16 are provided inside the battery cover 14. The safety valve mechanism 15 is electrically connected to the battery cover 14 through the PTC device 16. In the safety valve mechanism 15, in the case where the internal pressure becomes a certain level or more by internal short circuit, external heating, or the like, a disk plate 15A inverts to cut electric connection between the battery cover 14 and the spirally wound electrode body 20. The PTC device 16 prevents abnormal heat generation resulting from a large current. In the PTC device 16, as temperature rises, its resistance is increased accordingly. The gasket 17 is made of, for example, an insulating material. The surface of the gasket 17 may be coated with asphalt.

In the center of the spirally wound electrode body 20, a center pin 24 may be inserted. For example, a cathode lead 25 made of a conductive material such as Al is connected to the cathode 21. For example, an anode lead 26 made of a conductive material such as Ni is connected to the anode 22. The cathode lead 25 is, for example, welded to the safety valve mechanism 15, and is electrically connected to the battery cover 14. The anode lead 26 is, for example, welded to the battery can 11, and is electrically connected to the battery can 11.

[Cathode]

In the cathode 21, for example, a cathode active material layer 21B is provided on a single surface or both surfaces of a cathode current collector 21A. The cathode current collector 21A is made of, for example, a conductive material such as Al, Ni, and stainless steel.

The cathode active material layer 21B contains, as cathode active materials, one, or two or more of cathode materials capable of inserting and extracting lithium ions. As needed, the cathode active material layer 21B may contain other material such as a cathode binder and a cathode electric conductor.

The cathode material is a lithium transition metal complex compound containing lithium (Li), one, or two or more transition metals, magnesium (Mg), and oxygen (O) as constituent elements. The lithium transition metal complex compound contains Mg on the surface, or both on the surface and inside thereof. More specifically, the lithium transition metal complex compound satisfies the following two physical property conditions.

As a first physical property condition, at the time of discharging and charging the secondary battery, two absorption edges satisfying predetermined conditions are obtained in a standardized X-ray absorption spectrum (horizontal axis: X-ray energy (eV), vertical axis: X-ray absorption intensity) of the lithium transition metal complex compound measured by an X-ray absorption spectroscopic method. Specifically, in a discharged state in which the discharge voltage is 3.0 V, a first absorption edge having absorption edge energy $E_1$ in X-ray absorption intensity of 0.5 exits in the range where X-ray energy is from 1303 eV to 1313 eV both inclusive. Further, in a charged state in which a charge voltage V is from 4.3 V to 4.5 V both inclusive, a second absorption edge having absorption edge energy $E_2$ in X-ray absorption intensity of 0.5 exits.

As a second physical property condition, the foregoing absorption edge energies $E_1$ and $E_2$ and the foregoing charge voltage V satisfy a relation of $E_2 - E_1 \geq (V - 4.25) \times 4$.

The lithium transition metal complex compound satisfies the first physical property condition. One reason for this is that, since Mg as one of the constituent elements exists in the vicinity of the surface of the lithium transition metal complex compound, the crystal structure of the lithium transition metal complex compound is stabilized. Thereby, a high discharge capacity is obtained from the initial charge and discharge. In addition thereto, even if charge and discharge are repeated, the discharge capacity is less likely to be lowered.

More specifically, at the time of charge, lithium ions are extracted from the lithium transition metal complex compound as a cathode active material. In this case, part (Li) of the constituent elements forming the crystal structure of the lithium transition metal complex compound is lost, and therefore the crystal structure becomes unstable. However, in the case where Mg exists in the vicinity of the surface of the lithium transition metal complex compound, the lost part of the crystal structure is compensated for by Mg, and therefore the crystal structure is stabilized even in a charged state. Thereby, even if the secondary battery is charged particularly under high voltage conditions, the crystal structure of the lithium transition metal complex compound is stably retained. Therefore, lowering of the discharge capacity caused by skewness, collapse, or the like of the crystal structure is suppressed.

Further, the lithium transition metal complex compound satisfies the second physical property condition. One reason for this is that, since the abundance of Mg existing in the vicinity of the surface of the lithium transition metal complex compound becomes appropriate with respect to the charge voltage V, a decomposition reaction of the electrolytic solution is suppressed. Thereby, even if charge and discharge are repeated, the discharge capacity is less likely to be lowered.

More specifically, in the secondary battery in a charged state, the cathode 21 has strong oxidizing characteristics. Therefore, the electrolytic solution is easily oxidized and decomposed in the vicinity of the surface of the cathode 21. Thereby, the absolute amount of the electrolytic solution used for charge and discharge reaction is decreased, and in addition thereto, a decomposed matter of the electrolytic solution and the like are formed as a film on the surface of the cathode active material. Therefore, move of electrons, lithium ions, and the like is inhibited, and the resistance is increased. However, in the case where the abundance of Mg existing in the vicinity of the surface of the lithium transition metal complex compound is appropriate, the oxidizing characteristics of the cathode 21 are decreased, and therefore the reactivity of the cathode 21 is suppressed. Thereby, even if charge and discharge are repeated, lowering of the discharge capacity caused by oxidative decomposition of the electrolytic solution is suppressed.

Specially, the lithium transition metal complex compound preferably contains cobalt as a transition metal, since thereby high energy density is obtained. However, transition metal type is not necessarily limited to cobalt.

A description will be given in detail of the X-ray absorption spectroscopic method used for determining the absorption edge energies E1 and E2. The X-ray absorption spectrum herein mentioned is what we call an X-ray absorption fine structure (XAFS) spectrum as described above. Details of a measurement method, an analysis method, and the like of the X-ray absorption spectroscopic method are described in "X-ray absorption spectroscopic method (published by Industrial Publishing & Consulting. Inc.)" edited by Toshiaki Ohta.

In the X-ray absorption spectroscopic method, a sample (lithium transition metal complex compound) is irradiated with X-ray while X-ray energy is changed in the vicinity of MgK absorption edge (X-ray energy: about 1303 eV), and thereby the intensity of the irradiated X-ray and the intensity of MgKα fluorescent X-ray generated from the sample are measured. In the spectrum in the vicinity of the absorption edge, the absorption edge position and the spectrum intensity (absorption intensity) reflect an electron state of the unbound vacant orbital of Mg, and therefore reflect an oxidation-reduction state or a local structure on the periphery of Mg. In this case, in order to change the irradiated X-ray energy, the measurement is preferably performed at a synchrotron radiation light facility. Examples of the facility include a radiation light research facility beam line BL-11A of Institute of Materials Structure Science, High Energy Accelerator Research Organization. In the case where the intensity of fluorescent X-ray is measured, MgKβ fluorescent X-ray may be measured together with the MgKα fluorescent X-ray. The intensity of X-ray passed through the sample, the intensity of a current flowing through the sample, or the like may be measured instead of the intensity of the fluorescent X-ray.

A value obtained by dividing the intensity of the fluorescent X-ray by the intensity of the irradiated X-ray is plotted with respect to the irradiated X-ray energy, and thereby XAFS spectrum (raw spectrum) is obtained. In this case, in order to improve measurement precision, energy of the XAFS spectrum is preferably calibrated by using a standard sample. Specifically, for example, the standard sample (commercially available MgO multicrystal powder) is similarly measured, and the energy of the XAFS spectrum (raw spectrum) is calibrated so that the extreme value of differentiation of the absorption intensity in the vicinity of the MgK absorption edge, that is, the energy of the inflection point becomes 1308.3 eV.

The XAFS spectrum used for determining the absorption edge energies E1 and E2 is a spectrum in which the spectrum intensity is standardized by a predetermined procedure in order to secure reproducibility and reliability, as seen in the description as "standardized X-ray absorption spectrum." In this case, after calibrating the energy of the XAFS spectrum by the foregoing procedure, the position of the extreme value of the differentiation of the absorption intensity in the vicinity of the MgK absorption edge is used as the standard, and a region on the lower energy side than the standard (region with the x-ray energy lower by from about 20 eV to about 75 eV both inclusive) is linearly approximated. Further, a region on the higher energy side than the foregoing standard (region with the X-ray energy higher by from about 30 eV to about 230 eV both inclusive) is quadric-approximated. The entire spectrum is standardized so that the intensity difference between the quadric and the linear becomes 1 for any X-ray energy.

With regard to the first physical property condition, for determining the absorption edge energy E1 of the first absorption edge, the secondary battery in a charged state is discharged so that the discharge voltage becomes 3.0 V. The secondary battery in a discharged state is disassembled, the cathode active material (lithium transition metal complex compound) is taken out from the cathode 21, and the XAFS spectrum is measured by the foregoing procedure. If Mg exists in the vicinity of the surface of the lithium transition metal complex compound, the first absorption edge should be detected in the region where the X-ray energy is from 1303 eV to 1313 eV both inclusive in the XAFS spectrum. In the case where the first absorption edge is detected, the X-ray energy with the X-ray absorption intensity of 0.5 in the first absorption edge is regarded as E1.

Further, for determining the absorption edge energy E2 of the second absorption edge, the secondary battery is charged so that the charge voltage V becomes from 4.3 V to 4.5 V both inclusive. The secondary battery in a charged state is disassembled, the cathode active material (lithium transition metal complex compound) is taken out from the cathode 21, and the XAFS spectrum is measured by the foregoing procedure. In the case where the second absorption edge is detected in the XAFS spectrum, the X-ray energy with the X-ray absorption intensity of 0.5 in the second absorption edge is regarded as E2.

If the absorption edge energies E1 and E2 are allowed to be determined by the foregoing procedure, whether or not the relational expression of the second physical property condition (E2−E1≥(V−4.25)×4) is satisfied is allowed to be checked based on the charge voltage V set for measuring the absorption edge energy E2.

The charge voltage and the discharge voltage in the case that the secondary battery is charged and discharged for determining the absorption edge energies E1 and E2 are not particularly limited. Specially, the upper limit value of the charge voltage is preferably from 4.2 V to 4.8 V both inclusive, and the lower limit value of the discharge voltage is preferably from 2 V to 3.3 V both inclusive. Further, the upper limit value of the charge voltage is more preferably from 4.25 V to 4.8 V both inclusive, and the lower limit value of the discharge voltage is more preferably from 2 V to 3.3 V both inclusive. One reason for this is that the foregoing advantage is obtained even if the charge voltage and the discharge voltage are set as above.

The composition of the lithium transition metal complex compound is not particularly limited as long as the lithium transition metal complex compound contains lithium, one, or two or more transition metals, magnesium, and oxygen as constituent elements, and satisfies the two physical property conditions as described above.

Specially, the lithium transition metal complex compound preferably includes a central portion containing lithium, one, or two or more transition metals, and oxygen as constituent elements and a covering portion provided in part or all of the surface of the central portion. In this case, it is enough that the central portion, the covering portion, or both contain magnesium as a constituent element.

The composition of the central portion is not particularly limited as long as the central portion contains lithium, one, or two or more transition metals, and oxygen as constituent elements. Specially, the central portion preferably contains one or more of compounds represented by Formula (1) to Formula (5) described below, since thereby high energy density is obtained.

$$Li_{0.9+a}Co_b M1_{1-b}O_2 \quad (1)$$

In Formula (1), M1 represents one or more of Al, Mg, and Ba. a and b satisfy 0≤a≤0.2 and 0<b≤1.

$$Li_{0.9+c}Ni_d Co_{1-d-e}M2_e O_2 \quad (2)$$

In Formula (2), M2 represents one or more of Mg, Al, Mn, and Ba. c, d, and e satisfy 0≤c<0.2 and 0<d+e<1.

$$Li_{1+f}(Mn_g Ni_h Co_{1-g-h})_{1-f}O_2 \quad (3)$$

In Formula (3), f, g, and h satisfy 0.05≤f<0.25, 0.5≤g<0.7, and 0≤h≤(1−g).

$$Li_{1+i}M3PO_4 \quad (4)$$

In Formula (4), M3 represents one or more of Fe, Mn, and Co. i satisfies 0≤i≤0.1.

$$Li_{0.9+j}Mn_{2-k}M4_k O_4 \quad (5)$$

In Formula (5), M4 represents one or more of Al, Fe, Co, Cu, Cr, and Ni. j and k satisfy 0≤j≤0.2 and 0.5≤k<1.

The compounds represented by Formula (1) to Formula (3) are lithium transition metal complex oxides each having a bedded salt-type crystal structure. The compound represented by Formula (4) is a lithium transition metal complex oxide having an olivine-type crystal structure. The compound represented by Formula (5) is a lithium transition metal complex phosphate having a spinel-type crystal structure.

Specific examples of the compound represented by Formula (1) include $LiCoO_2$ and $LiCo_{0.98}Al_{0.01}Mg_{0.01}O_2$. Specific examples of the compound represented by Formula (2) include $LiNi_{0.5}Co_{0.2}Mn_{0.3}O_2$ and $Li_{1.03}Ni_{0.77}CO_{0.2}Al_{0.03}O_2$. Specific examples of the compound represented by Formula (3) include $Li_{1.13}(Mn_{0.6}Ni_{0.2}Co_{0.2})_{0.87}O_2$. Specific examples of the compound represented by Formula (4) include $Li_{1.01}FePO_4$ and $Li_{1.02}Fe_{0.1}Mn_{0.9}PO_4$. Specific examples of the compound represented by Formula (5) include $LiMn_2O_4$ and $LiMn_{1.8}Ni_{0.2}O_4$.

Some of the compounds represented by Formula (1) to Formula (5) contain Mg as a constituent element, and the others of the compounds represented by Formula (1) to Formula (5) do not contain Mg as a constituent element. Therefore, the composition of the covering portion varies according to the composition of the central portion.

Specifically, the compounds represented by Formula (3) to Formula (5) do not contain Mg as a constituent element, and therefore the covering portion should contain Mg as a constituent element. The covering portion is not particularly limited as long as the covering portion is made of a material containing Mg as a constituent element. For example, the covering portion contains one or more of a carbonate, a sulfate, a phosphate, a halide, and the like of Mg. Halide type is not particularly limited, and is, for example, a fluoride.

Meanwhile, in the case where the compounds represented by Formula (1) and Formula (2) contain Mg as a constituent element, the covering portion may contain Mg as a constituent element, or the covering portion does not necessarily contain Mg as a constituent element. The covering portion may contain a metal salt of an element other than Mg in addition to the carbonate of Mg and/or the like as described above. Examples of the metal salt include one or more of a carbonate, a sulfate, a phosphate, a halide, and the like of Al, Ti, or the like.

Specially, the covering portion preferably contains Mg as a constituent element. One reason for this is that, since in this case Mg easily exists in the vicinity of the surface of the lithium transition metal complex compound, a higher effect is obtained.

The lithium transition metal complex compound including the central portion and the covering portion is formed by the following procedure. First, powder of a formation material (raw material) of each of the central portion and the covering portion is prepared. After that, the raw material powder is weighed and mixed. Subsequently, the raw material powder is pulverized and mixed by using a ball mill, a masher, a pulverizing mill, or the like to cover the surface of the central portion with the covering portion. After that, as needed, the central portion and the covering portion are fired and cooled to obtain the lithium transition metal complex compound. In this case, by adjusting conditions such as the particle diameter of the formation material powder of the central portion, the firing temperature, and the firing time, the absorption edge energies E1 and E2 are controlled.

However, the surface of the central portion may be covered with the covering portion by using, for example, mechanochemical treatment or crystallization due to neutralization in a liquid phase. Further, a vapor-phase deposition method such as a sputtering method and a chemical vapor deposition (CVD) method may be used. The raw material powder may be mixed in a solvent such as water and ethanol. In addition, it is possible that the raw material of the covering portion is added to the cathode 21, the electrolytic solution, or the like, and the surface of the central portion is covered with the covering portion by charge and discharge, heating, or the like.

The cathode active material layer 21B may contain other cathode material as a cathode active material together with the foregoing lithium transition metal complex compound. The cathode material may be, for example, an oxide, a disulfide, a chalcogenide, a conductive polymer, or the like. Examples of the oxide include titanium oxide, vanadium oxide, and manganese dioxide. Examples of the disulfide include titanium disulfide and molybdenum sulfide. Examples of the chalcogenide include niobium selenide. Examples of the conductive polymer include sulfur, polyaniline, and polythiophene.

Examples of the cathode binder include one, or two or more of synthetic rubbers, polymer materials, and the like. Examples of the synthetic rubber include a styrene butadiene-based rubber, a fluorine-based rubber, and an ethylene propylene diene. Examples of the polymer material include polyvinylidene fluoride and polyimide.

Examples of the cathode electric conductor include one, or two or more of carbon materials and the like. Examples of the carbon materials include graphite, carbon black, acetylene black, and Ketjen black. It is to be noted that the cathode electric conductor may be a metal material, a conductive polymer, or the like as long as the material has electric conductivity.

[Anode]

In the anode 22, for example, an anode active material layer 22B is provided on a single surface or both surfaces of an anode current collector 22A.

The anode current collector 22A is made of, for example, a conductive material such as Cu, Ni, and stainless steel. The surface of the anode current collector 22A is preferably roughened. Thereby, due to what we call an anchor effect, adhesion characteristics of the anode active material layer 22B with respect to the anode current collector 22A are improved. In this case, it is enough that the surface of the anode current collector 22A in the region opposed to the anode active material layer 22B is roughened at minimum. Examples of roughening methods include a method of forming fine particles by electrolytic treatment. The electrolytic treatment is a method of providing concavity and convexity by forming fine particles on the surface of the anode current collector 22A by an electrolytic method in an electrolytic bath. A copper foil formed by an electrolytic method is generally called "electrolytic copper foil."

The anode active material layer 22B contains one, or two or more of anode materials capable of inserting and extracting lithium ions as anode active materials, and may also contain other material such as an anode binder and an anode electric conductor as needed. Details of the anode binder and the anode electric conductor are, for example, respectively similar to those of the cathode binder and the cathode electric conductor. In the anode active material layer 22B, a chargeable capacity of the anode material is preferably larger than a discharge capacity of the cathode 21 in order to prevent unintentional precipitation of lithium metal at the time of charge and discharge, for example.

Examples of the anode material include a carbon material. In the carbon material, its crystal structure change at the time of insertion and extraction of lithium ions is extremely small. Therefore, the carbon material provides high energy density and superior cycle characteristics. Further, the carbon material functions as an anode electric conductor as well. Examples of the carbon material include graphitizable carbon, non-graphitizable carbon in which the spacing of (002) plane is equal to or greater than 0.37 nm, and graphite in which the spacing of (002) plane is equal to or smaller than 0.34 nm. More specifically, examples of the carbon material include pyrolytic carbons, cokes, glassy carbon fiber, an organic polymer compound fired body, activated carbon, and carbon blacks. Of the foregoing, examples of the cokes include pitch coke, needle coke, and petroleum coke. The organic polymer compound fired body is obtained by firing (carbonizing) a polymer compound such as a phenol resin and a furan resin at appropriate temperature. In addition, the carbon material may be a low crystalline carbon or amorphous carbon heat-treated at temperature equal to or lower than about 1000 deg C. The shape of the carbon material may be any of a fibrous shape, a spherical shape, a granular shape, and a scale-like shape.

Further, the anode material may be, for example, a material (metal-based material) containing one, or two or more of metal elements and metalloid elements as constituent elements, since high energy density is thereby obtained. Such a metal-based material may be a simple substance, an alloy, or a compound, may be two or more thereof, or may have one or more phases thereof in part or all thereof "Alloy" includes a material containing one or more metal elements and one or more metalloid elements, in addition to a material formed of two or more metal elements. Further, the alloy may contain a nonmetallic element. Examples of the structure thereof include a solid solution, a eutectic crystal (eutectic mixture), an intermetallic compound, and a structure in which two or more thereof coexist.

The foregoing metal element or the foregoing metalloid element may be, for example, a metal element or a metalloid element capable of forming an alloy with Li. Specific examples thereof include one, or two or more of Mg, B, Al, Ga, In, Si, Ge, Sn, Pb, Bi, Cd, Ag, Zn, Hf, Zr, Y, Pd, and Pt. Specially, Si or Sn or both are preferably used. Si and Sn have a high ability of inserting and extracting lithium ions, and therefore provide high energy density.

A material containing Si or Sn or both may be, for example, a simple substance, an alloy, or a compound of Si or Sn; two or more thereof; or a material having one, or two or more phases thereof in part or all thereof. The simple substance merely refers to a general simple substance (a small amount of impurity may be therein contained), and does not necessarily refer to a purity 100% simple substance.

Examples of the alloys of Si include a material containing one, or two or more of the following elements as constituent elements other than Si. Such elements other than Si are Sn, Ni, Cu, Fe, Co, Mn, Zn, In, Ag, Ti, Ge, Bi, Sb, and Cr. Examples of the compounds of Si include a material containing C or O as a constituent element other than Si. For example, the compounds of Si may contain one, or two or more of the elements described for the alloys of Si as constituent elements other than Si.

Examples of the alloys or the compounds of Si include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), and LiSiO. v in $SiO_v$ may be in the range of $0.2<v<1.4$.

Examples of the alloys of Sn include a material containing one, or two or more of the following elements as constituent elements other than Sn. Such elements are Si, Ni, Cu, Fe, Co, Mn, Zn, In, Ag, Ti, Ge, Bi, Sb, and Cr. Examples of the compounds of Sn include a material containing C or O as a constituent element. The compounds of Sn may contain one, or two or more of the elements described for the alloys of Sn as constituent elements other than Sn. Examples of the alloys or the compounds of Sn include $SnO_w$ ($0<w\leq2$), $SnSiO_3$, LiSnO, and $Mg_2Sn$.

Further, as a material containing Sn, for example, a material containing a second constituent element and a third constituent element in addition to Sn as a first constituent element is preferable. Examples of the second constituent element include one, or two or more of Co, Fe, Mg, Ti, V, Cr, Mn, Ni, Cu, Zn, Ga, Zr, Nb, Mo, Ag, In, Ce, Hf, Ta, W, Bi, and Si. Examples of the third constituent element include one, or two or more of B, C, Al, and P. In the case where the second constituent element and the third constituent element are contained, a high battery capacity, superior cycle characteristics, and the like are obtained.

Specially, a material containing Sn, Co, and C (SnCoC-containing material) is preferable. The composition of the SnCoC-containing material is, for example, as follows. That is, the C content is from 9.9 mass % to 29.7 mass % both inclusive, and the ratio of Sn and Co contents (Co/(Sn+Co)) is from 20 mass % to 70 mass % both inclusive, since high energy density is obtained in such a composition range.

It is preferable that the SnCoC-containing material have a phase containing Sn, Co, and C. Such a phase is preferably low-crystalline or amorphous. The phase is a reaction phase capable of reacting with Li. Due to existence of the reaction phase, superior characteristics are obtained. The half bandwidth of the diffraction peak obtained by X-ray diffraction of the phase is preferably equal to or greater than 1.0 deg based on diffraction angle of $2\theta$ in the case where CuK$\alpha$ ray is used as a specific X ray, and the insertion rate is 1 deg/min. Thereby, lithium ions are more smoothly inserted and extracted, and reactivity with the electrolytic solution is decreased. It is to be noted that, in some cases, the SnCoC-containing material includes a phase containing a simple substance or part of the respective constituent elements in addition to the low-crystalline phase or the amorphous phase.

Whether or not the diffraction peak obtained by the X-ray diffraction corresponds to the reaction phase capable of reacting with Li is easily determined by comparison between X-ray diffraction charts before and after electrochemical reaction with Li. For example, if the position of the diffraction peak after electrochemical reaction with Li is changed from the position of the diffraction peak before the electrochemical reaction with Li, the obtained diffraction peak corresponds to the reaction phase capable of reacting with Li. In this case, for example, the diffraction peak of the low crystalline reaction phase or the amorphous reaction phase is seen in the range of $2\theta$=from 20 to 50 deg both inclusive. Such a reaction phase has, for example, the foregoing respective constituent elements, and the low crystalline or amorphous structure thereof possibly results from existence of C mainly.

In the SnCoC-containing material, part or all of C as a constituent element are preferably bonded with a metal element or a metalloid element as other constituent element, since thereby cohesion or crystallization of Sn and/or the like is suppressed. The bonding state of elements is allowed to be checked by, for example, X-ray photoelectron spectroscopy (XPS). In a commercially available device, for example, as a soft X ray, Al-K$\alpha$ ray, Mg—K$\alpha$ ray, or the like is used. In the case where part or all of C are bonded with a metal element, a metalloid element, or the like, the peak of a synthetic wave of is orbit of C (C1s) is shown in a region lower than 284.5 eV. In the device, energy calibration is made so that the peak of 4f orbit of Au atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of C in the SnCoC-containing material. Therefore, for example, analysis is made by using commercially available software to isolate both peaks from each other. In the waveform analysis, the position of the main peak existing on the lowest bound energy side is the energy standard (284.8 eV).

It is to be noted that the SnCoC-containing material may further contain other constituent element as needed. Examples of other constituent elements include one, or two or more of Si, Fe, Ni, Cr, In, Nb, Ge, Ti, Mo, Al, P, Ga, and Bi.

In addition to the SnCoC-containing material, a material containing Sn, Co, Fe, and C (SnCoFeC-containing material) is also preferable. The composition of the SnCoFeC-containing material may be arbitrarily set. For example, the composition in which the Fe content is set small is as follows. That is, the C content is from 9.9 mass % to 29.7 mass % both inclusive, the Fe content is from 0.3 mass % to 5.9 mass % both inclusive, and the ratio of contents of Sn and Co (Co/(Sn+Co)) is from 30 mass % to 70 mass % both inclusive. Further, for example, the composition in which the Fe content is set large is as follows. That is, the C content is from 11.9 mass % to 29.7 mass % both inclusive, the ratio of contents of Sn, Co, and Fe ((Co+Fe)/(Sn+Co+Fe)) is from 26.4 mass % to 48.5 mass % both inclusive, and the ratio of contents of Co and Fe (Co/(Co+Fe)) is from 9.9 mass % to 79.5 mass % both inclusive. In such a composition range, high energy density is obtained. Physical properties (half bandwidth and the like) of the SnCoFeC-containing material are similar to those of the foregoing SnCoC-containing material.

In addition, the anode material may be, for example, a metal oxide, a polymer compound, or the like. Examples of the metal oxide include iron oxide, ruthenium oxide, and molybdenum oxide. Examples of the polymer compound include polyacetylene, polyaniline, and polypyrrole.

The anode active material layer 22B is formed by, for example, a coating method, a vapor-phase deposition method, a liquid-phase deposition method, a spraying method, a firing method (sintering method), or a combination of two or more of these methods. The coating method is a method in which, for example, after a particulate anode active material is mixed with a binder or the like, the mixture is dispersed in a solvent such as an organic solvent, and the anode current collector is coated with the resultant. Examples of the vapor-phase deposition method include a physical deposition method and a chemical deposition method. Specifically, examples thereof include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase deposition method include an electrolytic plating method and an electroless plating method. The spraying method is a method in which an anode active material is sprayed in a fused state or a semi-fused state. The firing method is, for example, a method in which after the anode current collector is coated by a procedure similar to that of the coating method, heat treatment is performed at temperature higher than the melting point of the binder or the like. Examples of the firing method include a publicly-known technique such as an atmosphere firing method, a reactive firing method, and a hot press firing method.

In the secondary battery, as described above, in order to prevent Li metal from being unintentionally precipitated on the anode 22 in the middle of charge, the electrochemical equivalent of the anode material capable of inserting and extracting lithium ions is larger than the electrochemical equivalent of the cathode. Further, in the case where the open circuit voltage (that is, a battery voltage) at the time of completely-charged state is equal to or greater than 4.25 V, the extraction amount of lithium ions per unit mass is larger than that in the case that the open circuit voltage is 4.20 V even if the same cathode active material is used. Therefore, amounts of the cathode active material and the anode active material are adjusted accordingly. Thereby, high energy density is obtained.

[Separator]

The separator 23 separates the cathode 21 from the anode 22, and passes lithium ions while preventing current short circuit resulting from contact of both electrodes. The separator 23 is formed of, for example, a porous film made of a synthetic resin or ceramics. The separator 23 may be a laminated film in which two or more types of porous films are layered. Examples of the synthetic resin include polytetrafluoroethylene, polypropylene, and polyethylene.

In particular, the separator 23 may include, for example, a base material layer formed of the foregoing porous film and a polymer compound layer provided on one surface or both surfaces of the base material layer. Thereby, adhesion characteristics of the separator 23 with respect to the cathode 21 and the anode 22 are improved, and therefore skewness of the spirally wound electrode body 20 is suppressed. Thereby, a decomposition reaction of the electrolytic solution is suppressed, and liquid leakage of the electrolytic solution with which the base material layer is impregnated is suppressed. Accordingly, even if charge and discharge are repeated, the resistance of the secondary battery is less likely to be increased, and battery swollenness is suppressed.

The polymer compound layer contains, for example, a polymer material such as polyvinylidene fluoride, since such a polymer material has a superior physical strength and is electrochemically stable. However, the polymer material may be a material other than polyvinylidene fluoride. The polymer compound layer is formed as follows, for example. That is, after a solution in which the polymer material is dissolved is prepared, the surface of the base material layer is coated with the solution or the base material layer is soaked in the solution, and the resultant is subsequently dried.

[Electrolytic Solution]

The separator 23 is impregnated with an electrolytic solution as a liquid electrolyte. The electrolytic solution contains other material such as an additive as needed together with a solvent and an electrolyte salt.

The solvent contains, for example, one, or two or more of nonaqueous solvents such as an organic solvent. Examples of the nonaqueous solvents include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate, and dimethyl sulfoxide. By using such a nonaqueous solvent, a superior battery capacity, superior cycle characteristics, superior conservation characteristics, and the like are obtained.

Specially, one or more of ethylene carbonate, propylene carbonate, dimethyl carbonate, diethyl carbonate, and ethyl methyl carbonate are preferable, since thereby more superior characteristics are obtained. In this case, a combination of a high viscosity (high dielectric constant) solvent (for example, specific dielectric constant $\in \geq 30$) such as ethylene carbonate and propylene carbonate and a low viscosity solvent (for example, viscosity$\leq 1$ mPa·s) such as dimethyl carbonate, ethylmethyl carbonate, and diethyl carbonate is more preferable. Thereby, dissociation property of the electrolyte salt and ion mobility are improved.

In particular, the solvent preferably contains a cyclic ester carbonate having one, or two or more unsaturated carbon bonds (unsaturated cyclic ester carbonate). One reason for this is that, in this case, since a stable protective film is formed on the surface of the anode 22 at the time of charge and discharge, a decomposition reaction of the electrolytic solution is suppressed. Examples of the unsaturated cyclic ester carbonate include vinylene carbonate (1,3-dioxole-2-one), methylvinylene carbonate (4-methyl-1,3-dioxole-2-one), methylvinylene carbonate (4-ethyl-1,3-dioxole-2-one), 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. The content of the unsaturated carbon bond cyclic ester carbonate in the solvent is, for example, from 0.01 wt % to 10 wt % both inclusive, since thereby a decomposition reaction of the electrolytic solution is suppressed while a battery capacity is not excessively lowered.

Further, the solvent preferably contains a chain ester carbonate having one, or two or more halogens (halogenated chain ester carbonate), or a cyclic ester carbonate having one, or two or more halogens (halogenated cyclic ester carbonate), or both. One reason for this is that, since a stable protective film is thereby formed on the surface of the anode 22 at the time of charge and discharge, a decomposition reaction of the electrolytic solution is suppressed. Though halogen type is not particularly limited, specially, F, Cl, or Br is preferable, and F is more preferable, since thereby a higher effect is obtained. The number of halogens is more preferably two than one, and further may be three or more, since thereby a more rigid and more stable protective film is formed, and therefore a decomposition reaction of the electrolytic solution is more suppressed.

Examples of the halogenated chain ester carbonate include fluoromethyl methyl carbonate, bis(fluoromethyl) carbonate, and difluoromethyl methyl carbonate. Examples of the halogenated cyclic ester carbonate include 4-fluoro-1,3-dioxolane-2-one, 4-chloro-1,3-dioxolane-2-one, 4,5-difluoro-1,3-dioxolane-2-one, tetrafluoro-1,3-dioxolane-2-one, 4-fluoro-5-chloro-1,3-dioxolane-2-one, 4,5-dichloro-1,3-dioxolane-2-one, tetrachloro-1,3-dioxolane-2-one, 4,5-bistrifluoromethyl-1,3-dioxolane-2-one, 4-trifluoromethyl-1,3-dioxolane-2-one, 4,5-difluoro-4,5-dimethyl-1,3-dioxolane-2-one, 4-methyl-5,5-difluoro-1,3-dioxolane-2-one, 4-ethyl-5,5-difluoro-1,3-dioxolane-2-one, 4-trifluoromethyl-5-fluoro-1,3-dioxolane-2-one, 4-trifluoromethyl-5-methyl-1,3-dioxolane-2-one, 4-fluoro-4,5-dimethyl-1,3-dioxolane-2-one, 4,4-difluoro-5-(1,1-difluoroethyl)-1,3-dioxolane-2-one, 4,5-dichloro-4,5-dimethyl-1,3-dioxolane-2-one, 4-ethyl-5-fluoro-1,3-dioxolane-2-one, 4-ethyl-4,5-difluoro-1,3-dioxolane-2-one, 4-ethyl-4,5,5-trifluoro-1,3-dioxolane-2-one, and 4-fluoro-4-methyl-1,3-dioxolane-2-one. The contents of the halogenated chain ester carbonate and the halogenated cyclic ester carbonate in the nonaqueous solvent are, for example, from 0.01 wt % to 50 wt % both inclusive, since thereby a decomposition reaction of the electrolytic solution is suppressed while a battery capacity is not excessively lowered.

Further, the solvent may contain sultone (cyclic sulfonic ester), since thereby chemical stability of the electrolytic solution is improved. Examples of the sultone include propane sultone and propene sultone. Though the content of the sultone in the solvent is not particularly limited, for example, the content thereof is from 0.5 wt % to 5 wt % both inclusive, since thereby a decomposition reaction of the electrolytic solution is suppressed while a battery capacity is not excessively lowered.

Further, the solvent may contain an acid anhydride, since chemical stability of the electrolytic solution is thereby further improved. Examples of the acid anhydride include a dicarboxylic anhydride, a disulfonic anhydride, and a carboxylic sulfonic anhydride. Examples of the dicarboxylic anhydride include succinic anhydride, glutaric anhydride, and maleic anhydride. Examples of the disulfonic anhydride include anhydrous ethane disulfonic acid and anhydrous propane disulfonic acid. Examples of the carboxylic sulfonic anhydride include anhydrous sulfobenzoic acid, anhydrous sulfopropionate, and anhydrous sulfobutyrate. Though the content of the acid anhydride in the solvent is not particularly limited, for example, the content thereof is from 0.5 wt % to 5 wt % both inclusive since thereby a decomposition reaction of the electrolytic solution is suppressed while a battery capacity is not excessively lowered.

[Electrolyte Salt]

The electrolyte salt contains, for example, one, or two or more of lithium salts described below. However, the electrolyte salt may be a salt other than the lithium salt (for example, a light metal salt other than the lithium salt).

Examples of the lithium salt include compounds such as $LiPF_6$, $LiBF_4$, $LiClO_4$, $LiAsF_6$, $LiB(C_6H_5)_4$, $LiCH_3SO_3$, $LiCF_3SO_3$, $LiAlCl_4$, $Li_2SiF_6$, $LiCl$, and $LiBr$. Thereby, a superior battery capacity, superior cycle characteristics, superior conservation characteristics, and the like are obtained.

Specially, one or more of $LiPF_6$, $LiBF_4$, $LiClO_4$, and $LiAsF_6$ are preferable, and $LiPF_6$ is more preferable, since thereby the internal resistance is lowered, and higher effects are obtained.

The content of the electrolyte salt is preferably from 0.3 mol/kg to 3.0 mol/kg both inclusive with respect to the solvent, since thereby high ion conductivity is obtained.

[Operation of Secondary Battery]

In the secondary battery, for example, at the time of charge, lithium ions extracted from the cathode 21 are inserted in the anode 22 through the electrolytic solution. Further, at the time of discharge, lithium ions extracted from the anode 22 are inserted in the cathode 21 through the electrolytic solution.

[Method of Manufacturing Secondary Battery]

The secondary battery is manufactured, for example, by the following procedure.

First, the cathode 21 is formed. A cathode active material containing a lithium transition metal complex compound is mixed with a cathode binder, a cathode electric conductor, and/or the like as needed to prepare a cathode mixture. Subsequently, the cathode mixture is dispersed in an organic solvent or the like to obtain a paste cathode mixture slurry. Subsequently, both surfaces of the cathode current collector 21A are coated with the cathode mixture slurry, which is dried to form the cathode active material layer 21B. Subsequently, the cathode active material layer 21B is compression-molded by using a roll pressing machine or the like while being heated as needed. In this case, compression-molding may be repeated several times.

Further, the anode 22 is formed by a procedure similar to that of the cathode 21 described above. An anode active material is mixed with an anode binder, an anode electric conductor, and/or the like as needed to prepare an anode mixture, which is subsequently dispersed in an organic solvent or the like to form a paste anode mixture slurry. Subsequently, both surfaces of the anode current collector 22A are coated with the anode mixture slurry, which is dried to form the anode active material layer 22B. After that, the anode active material layer 22B is compression-molded as needed.

Finally, the secondary battery is assembled by using the cathode 21 and the anode 22. First, the cathode lead 25 is attached to the cathode current collector 21A by using a welding method or the like, and the anode lead 26 is attached to the anode current collector 22A by using a welding method or the like. Subsequently, the cathode 21 and the anode 22 are layered with the separator 23 in between and are spirally wound, and thereby the spirally wound electrode body 20 is formed. After that, the center pin 24 is inserted in the center of the spirally wound electrode body 20. Subsequently, the spirally wound electrode body 20 is sandwiched between the pair of insulating plates 12 and 13, and is contained in the battery can 11. In this case, the end tip of the cathode lead 25 is attached to the safety valve mechanism 15 by using a welding method or the like, and the end tip of the anode lead 26 is attached to the battery can 11 by using a welding method or the like. Subsequently, the electrolytic solution is injected into the battery can 11, and the separator 23 is impregnated with the electrolytic solution. Subsequently, at the open end of the battery can 11, the battery cover 14, the safety valve mechanism 15, and the PTC device 16 are fixed by being swaged with the gasket 17.

[Function and Effect of Secondary Battery]

According to the cylindrical type secondary battery, the cathode 21 contains the lithium transition metal complex compound that contains Mg as a constituent element and satisfies the foregoing two physical property conditions. In this case, as described above, Mg exists in the vicinity of the surface of the lithium transition metal complex compound, and the abundance of Mg becomes appropriate. Therefore, even at the time of charge under high voltage conditions, the crystal structure is stably retained, and a decomposition reaction of the electrolytic solution is inhibited. Therefore, a high discharge capacity is obtained from the initial charge and discharge. In addition thereto, even if charge and discharge are repeated, the discharge capacity is less likely to be lowered. Accordingly, superior battery characteristics are allowed to be obtained.

In particular, in the case where the lithium transition metal complex compound includes the central portion and the covering portion, and the covering portion contains Mg as a constituent element, higher effects are obtainable. Further, in the case where the central portion contains one or more of the compounds represented by Formula (1) to Formula (5), or the lithium transition metal complex compound contains Co as a transition metal, higher effects are obtainable.

Further, in the case where the upper limit value of the charge voltage is from 4.2 V to 4.8 V both inclusive, and more preferably from 4.25 V to 4.8 V both inclusive, higher effects are obtainable.

[1-2. Laminated Film Type]

Figure 3:
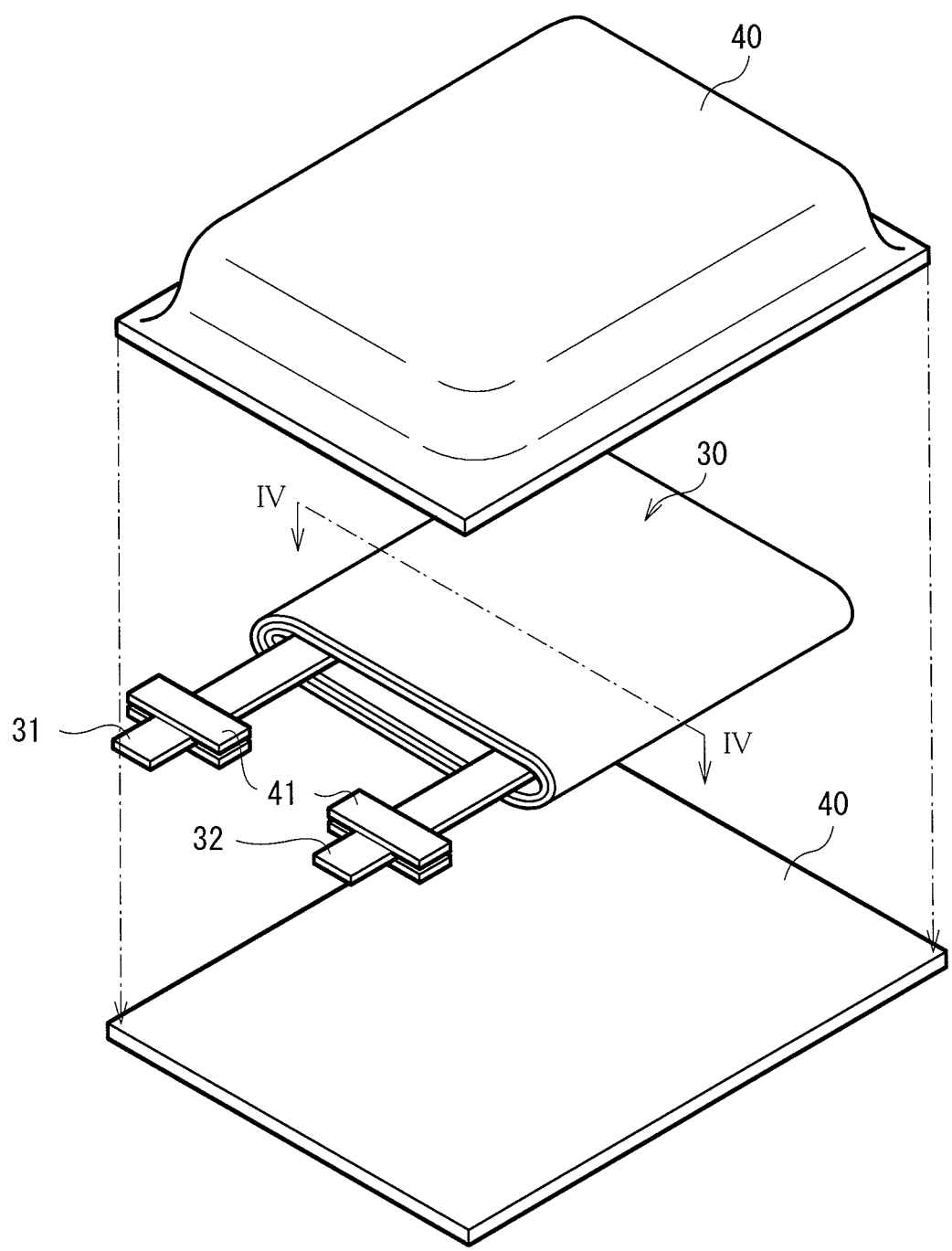
FIG. 3 is a perspective view illustrating a configuration of another secondary battery (laminated film type) according to an embodiment of the present application.
Figure 4:
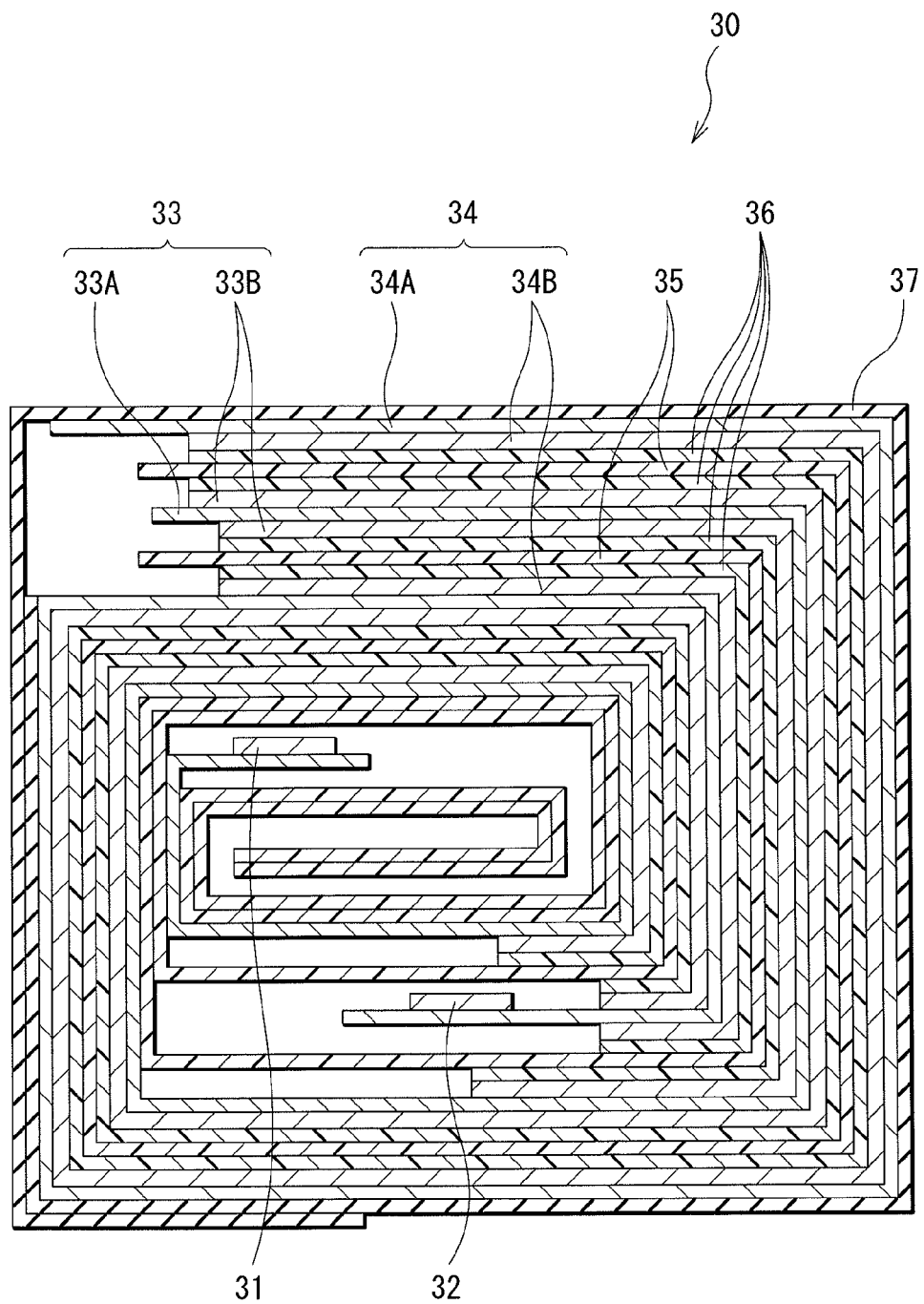
FIG. 4 is a cross-sectional view taken along a line IV-IV of a spirally wound electrode body illustrated in FIG. 3.

FIG. 3 illustrates an exploded perspective configuration of another secondary battery according to an embodiment of the present application. FIG. 4 illustrates an enlarged cross-section taken along a line IV-IV of a spirally wound electrode body 30 illustrated in FIG. 3. In the following description, the elements of the cylindrical type secondary battery described above will be used as needed.

[Whole Structure of Secondary Battery]

The secondary battery herein described is what we call a laminated film type lithium ion secondary battery. In the secondary battery, the spirally wound electrode body 30 is contained in a film outer package member 40. In the spirally wound electrode body 30, a cathode 33 and an anode 34 are layered with a separator 35 and an electrolyte layer 36 in between and are spirally wound. A cathode lead 31 is attached to the cathode 33, and an anode lead 32 is attached to the anode 34. The outermost periphery of the spirally wound electrode body 30 is protected by a protective tape 37.

The cathode lead 31 and the anode lead 32 are, for example, led out from inside to outside of the outer package member 40 in the same direction. The cathode lead 31 is made of, for example, a conductive material such as Al, and the anode lead 32 is made of, for example, a conducive material such as Cu, Ni, and stainless steel. These materials are in the shape of, for example, a thin plate or mesh.

The outer package member 40 is a laminated film in which, for example, a fusion bonding layer, a metal layer, and a surface protective layer are layered in this order. In the laminated film, for example, the respective outer edges of the fusion bonding layers of two films are bonded with each other by fusion bonding, an adhesive, or the like so that the fusion bonding layers and the spirally wound electrode body 30 are opposed to each other. Examples of the fusion bonding layer include a film made of polyethylene, polypropylene, or the like. Examples of the metal layer include an Al foil. Examples of the surface protective layer include a film made of nylon, polyethylene terephthalate, or the like.

Specially, as the outer package member 40, an aluminum laminated film in which a polyethylene film, an aluminum foil, and a nylon film are layered in this order is preferable. However, the outer package member 40 may be made of a laminated film having other laminated structure, a polymer film such as polypropylene, or a metal film.

An adhesive film 41 to protect from outside air intrusion is inserted between the outer package member 40, and the cathode lead 31 and the anode lead 32. The adhesive film 41 is made of a material having adhesion characteristics with respect to the cathode lead 31 and the anode lead 32. Examples of such a material include a polyolefin resin such as polyethylene, polypropylene, modified polyethylene, and modified polypropylene.

In the cathode 33, for example, a cathode active material layer 33B is provided on both surfaces of a cathode current collector 33A. In the anode 34, for example, an anode active material layer 34B is provided on both surfaces of an anode current collector 34A. The configurations of the cathode current collector 33A, the cathode active material layer 33B, the anode current collector 34A, and the anode active material layer 34B are respectively similar to the configurations of the cathode current collector 21A, the cathode active material layer 21B, the anode current collector 22A, and the anode active material layer 22B. That is, the cathode active material layer 33B contains the lithium transition metal complex compound that contains lithium, one, or two or more transition metals, magnesium, and oxygen as constituent elements and satisfies the foregoing two physical property conditions. Further, the configuration of the separator 35 is similar to the configuration of the separator 23.

In the electrolyte layer 36, an electrolytic solution is held by a polymer compound. The electrolyte layer 36 may contain other material such as an additive as needed. The electrolyte layer 36 is what we call a gel electrolyte, since thereby high ion conductivity (for example, 1 mS/cm or more at room temperature) is obtained and liquid leakage of the electrolytic solution is prevented.

Examples of the polymer compound include one, or two or more of the following polymer materials and the like. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethacrylic acid methyl, polyacrylic acid, polymethacrylic acid, styrene-butadiene rubber, nitrile-butadiene rubber, polystyrene, and polycarbonate. Further examples thereof include a copolymer of vinylidene fluoride and hexafluoro propylene. Specially, polyvinylidene fluoride or the copolymer of vinylidene fluoride and hexafluoro propylene is preferable, and polyvinylidene fluoride is more preferable, since such a polymer compound is electrochemically stable.

The composition of the electrolytic solution is similar to the composition of the cylindrical type secondary battery. However, in the electrolyte layer 36 as a gel electrolyte, the solvent of the electrolytic solution represents a wide concept including not only a liquid solvent but also a material having ion conductivity capable of dissociating the electrolyte salt. Therefore, in the case where a polymer compound having ion conductivity is used, the polymer compound is also included in the solvent.

Instead of the gel electrolyte layer 36, the electrolytic solution may be used as it is. In this case, the separator 35 is impregnated with the electrolytic solution.

[Operation of Secondary Battery]

In the secondary battery, for example, at the time of charge, lithium ions extracted from the cathode 33 are inserted in the anode 34 through the electrolyte layer 36. Meanwhile, at the time of discharge, lithium ions extracted from the anode 34 are inserted in the cathode 33 through the electrolyte layer 36.

[Method of Manufacturing Secondary Battery]

The secondary battery including the gel electrolyte layer 36 is manufactured, for example, by the following three types of procedures.

In the first procedure, the cathode 33 and the anode 34 are formed by a formation procedure similar to that of the cathode 21 and the anode 22. In this case, the cathode 33 is formed by forming the cathode active material layer 33B on both surfaces of the cathode current collector 33A, and the anode 34 is formed by forming the anode active material layer 34B on both surfaces of the anode current collector 34A. Subsequently, a precursor solution containing an electrolytic solution, a polymer compound, and a solvent such as an organic solvent is prepared. After that, the cathode 33 and the anode 34 are coated with the precursor solution to form the gel electrolyte layer 36. Subsequently, the cathode lead 31 is attached to the cathode current collector 33A by a welding method or the like and the anode lead 32 is attached to the anode current collector 34A by a welding method or the like. Subsequently, the cathode 33 and the anode 34 provided with the electrolyte layer 36 are layered with the separator 35 in between and are spirally wound to form the spirally wound electrode body 30. After that, the protective tape 37 is adhered to the outermost periphery thereof. Subsequently, after the spirally wound electrode body 30 is sandwiched between two pieces of film-like outer package members 40, the outer edges of the outer package members 40 are bonded by a thermal fusion bonding method or the like to enclose the spirally wound electrode body 30 into the outer package members 40. In this case, the adhesive films 41 are inserted between the cathode lead 31 and the anode lead 32, and the outer package member 40.

In the second procedure, the cathode lead 31 is attached to the cathode 33, and the anode lead 32 is attached to the anode 34. Subsequently, the cathode 33 and the anode 34 are layered with the separator 35 in between and are spirally wound to form a spirally wound body as a precursor of the spirally wound electrode body 30. After that, the protective tape 37 is adhered to the outermost periphery thereof. Subsequently, after the spirally wound body is sandwiched between two pieces of the film-like outer package members 40, the outermost peripheries except for one side are bonded by a thermal fusion bonding method or the like to obtain a pouched state, and the spirally wound body is contained in the pouch-like outer package member 40. Subsequently, a composition for electrolyte containing an electrolytic solution, a monomer as a raw material for the polymer compound, a polymerization initiator, and other material such as a polymerization inhibitor as needed is prepared, which is injected into the pouch-like outer package member 40. After that, the outer package member 40 is hermetically sealed by using a thermal fusion bonding method or the like. Subsequently, the monomer is thermally polymerized. Thereby, a polymer compound is formed, and therefore the gel electrolyte layer 36 is formed.

In the third procedure, the spirally wound body is formed and contained in the pouch-like outer package member 40 in a manner similar to that of the foregoing second procedure, except that the separator 35 with both surfaces coated with a polymer compound is used. Examples of the polymer compound with which the separator 35 is coated include a polymer (a homopolymer, a copolymer, a multicomponent copolymer, or the like) containing vinylidene fluoride as a component. Specific examples thereof include polyvinylidene fluoride, a binary copolymer containing vinylidene fluoride and hexafluoro propylene as components, and a ternary copolymer containing vinylidene fluoride, hexafluoro propylene, and chlorotrifluoroethylene as components. In addition to the polymer containing vinylidene fluoride as a component, other one, or two or more polymer compounds may be used. Subsequently, an electrolytic solution is prepared and injected into the outer package member 40. After that, the opening of the outer package member 40 is hermetically sealed by using a thermal fusion bonding method or the like. Subsequently, the resultant is heated while a weight is applied to the outer package member 40, and the separator 35 is adhered to the cathode 33 and the anode 34 with the polymer compound in between. Thereby, the polymer compound is impregnated with the electrolytic solution, and accordingly the polymer compound is gelated to form the electrolyte layer 36.

In the third procedure, swollenness of the secondary battery is suppressed more than in the first procedure. Further, in the third procedure, the monomer as a raw material of the polymer compound, the solvent, and the like are less likely to be left in the electrolyte layer 36 compared to in the second procedure. Therefore, the formation step of the polymer compound is favorably controlled. Therefore, sufficient adhesion characteristics are obtained between the cathode 33, the anode 34, and the separator 35, and the electrolyte layer 36.

[Function and Effect of Secondary Battery]

According to the laminated film type secondary battery, the cathode 33 contains the lithium transition metal complex compound that contains Mg as a constituent element and satisfies the foregoing two physical property conditions. Therefore, for a reason similar to that of the cylindrical type secondary battery, superior battery characteristics are obtainable. Other functions and other effects are similar to those of the cylindrical type secondary battery.

[2. Applications of Secondary Battery]

Next, a description will be given of application examples of the foregoing secondary battery.

Applications of the secondary battery are not particularly limited as long as the secondary battery is used for a machine, a device, an instrument, an apparatus, a system (collective entity of a plurality of devices and the like), or the like that is allowed to use the secondary battery as a driving electric power source, an electric power storage source for electric power storage, or the like. In the case where the secondary battery is used as an electric power source, the secondary battery may be used as a main electric power source (electric power source used preferentially), or an auxiliary electric power source (electric power source used instead of a main electric power source or used being switched from the main electric power source). In the latter case, the main power source type is not limited to the secondary battery.

Examples of applications of the secondary battery include mobile electronic devices such as a video camcorder, a digital still camera, a mobile phone, a notebook personal computer, a cordless phone, a headphone stereo, a portable radio, a portable television, and a personal digital assistant. Further examples thereof include a mobile lifestyle electric appliance such as an electric shaver; a memory device such as a backup electric power source and a memory card; an electric power tool such as an electric drill and an electric saw; a battery pack used as an electric power source of a notebook personal computer or the like; a medical electronic device such as a pacemaker and a hearing aid; an electric vehicle such as an electric automobile (including a hybrid automobile); and an electric power storage system such as a home battery system for storing electric power for emergency or the like. It is needless to say that an application other than the foregoing applications may be adopted.

Specially, the secondary battery is effectively applicable to the battery pack, the electric vehicle, the electric power storage system, the electric power tool, the electronic device, or the like. In these applications, since superior battery characteristics are demanded, the characteristics are allowed to be effectively improved by using the secondary battery according to the embodiment of the present application. It is to be noted that the battery pack is an electric power source using a secondary battery, and is what we call an assembled battery or the like. The electric vehicle is a vehicle that works (runs) by using a secondary battery as a driving electric power source. As described above, an automobile including a drive source other than a secondary battery (hybrid automobile or the like) may be included. The electric power storage system is a system using a secondary battery as an electric power storage source. For example, in a home electric power storage system, electric power is stored in the secondary battery as an electric power storage source, and the electric power is consumed as needed. Thereby, home electric products and the like become usable. The electric power tool is a tool in which a movable section (for example, a drill or the like) is moved by using a secondary battery as a driving electric power source. The electronic device is a device executing various functions by using a secondary battery as a driving electric power source.

A description will be specifically given of some application examples of the secondary battery. The configurations of the respective application examples explained below are merely examples, and may be changed as appropriate.

[2-1. Battery Pack]

Figure 5:
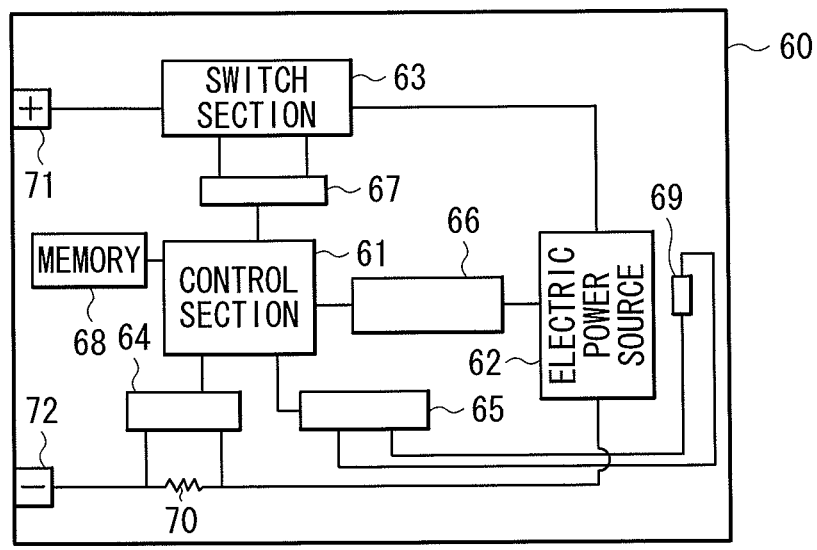
FIG. 5 is a block diagram illustrating a configuration of an application example (battery pack) of the secondary battery.

FIG. 5 illustrates a block configuration of a battery pack. For example, as illustrated in FIG. 5, the battery pack includes a control section 61, an electric power source 62, a switch section 63, a current measurement section 64, a temperature detection section 65, a voltage detection section 66, a switch control section 67, a memory 68, a temperature detection device 69, a current detection resistance 70, a cathode terminal 71, and an anode terminal 72 in a housing 60 made of a plastic material or the like.

The control section 61 controls operation of the whole battery pack (including a usage state of the electric power source 62), and includes, for example, a central processing unit (CPU) or the like. The electric power source 62 includes one, or two or more secondary batteries (not illustrated). The electric power source 62 is, for example, an assembled battery including two or more secondary batteries. Connection type thereof may be series-connected type, may be parallel-connected type, or a mixed type thereof. As an example, the electric power source 62 includes six secondary batteries connected in a manner of dual-parallel and three-series.

The switch section 63 switches the usage state of the electric power source 62 (whether or not the electric power source 62 is connectable to an external device) according to an instruction of the control section 61. The switch section 63 includes, for example, a charge control switch, a discharge control switch, a charging diode, a discharging diode, and the like (not illustrated). The charge control switch and the discharge control switch are, for example, semiconductor switches such as a field-effect transistor (MOSFET) using metal oxide semiconductor.

The current measurement section 64 measures a current by using the current detection resistance 70, and outputs the measurement result to the control section 61. The temperature detection section 65 measures temperature by using the temperature detection device 69, and outputs the measurement result to the control section 61. The temperature measurement result is used for, for example, a case in which the control section 61 controls charge and discharge at the time of abnormal heat generation or a case in which the control section 61 performs a correction processing at the time of calculating a remaining capacity. The voltage detection section 66 measures a voltage of the secondary battery in the electric power source 62, performs analog-to-digital conversion (A/D conversion) on the measured voltage, and supplies the resultant to the control section 61.

The switch control section 67 controls operation of the switch section 63 according to signals inputted from the current measurement section 64 and the voltage measurement section 66.

The switch control section 67 executes control so that a charge current is prevented from flowing in a current path of the electric power source 62 by disconnecting the switch section 63 (charge control switch) in the case where, for example, a battery voltage reaches an overcharge detection voltage. Thereby, in the electric power source 62, only discharge is allowed to be performed through the discharging diode. It is to be noted that, for example, in the case where a large current flows at the time of charge, the switch control section 67 blocks the charge current.

Further, the switch control section 67 executes control so that a discharge current is prevented from flowing in the current path of the electric power source 62 by disconnecting the switch section 63 (discharge control switch) in the case where, for example, a battery voltage reaches an overdischarge detection voltage. Thereby, in the electric power source 62, only charge is allowed to be performed through the charging diode. For example, in the case where a large current flows at the time of discharge, the switch control section 67 blocks the discharge current.

It is to be noted that, in the secondary battery, for example, the overcharge detection voltage is 4.20 V±0.05 V, and the over-discharge detection voltage is 2.4 V±0.1 V.

The memory 68 is, for example, an EEPROM as a non-volatile memory or the like. The memory 68 stores, for example, numerical values calculated by the control section 61 and information of the secondary battery measured in a manufacturing step (for example, an internal resistance in the initial state and/or the like). It is to be noted that, in the case where the memory 68 stores a full charge capacity of the secondary battery, the control section 10 is allowed to comprehend information such as a remaining capacity.

The temperature detection device 69 measures temperature of the electric power source 62, and outputs the measurement result to the control section 61. The temperature detection device 69 is, for example, a thermistor or the like.

The cathode terminal 71 and the anode terminal 72 are terminals connected to an external device (for example, a notebook personal computer or the like) driven by using the battery pack, or an external device (for example, a battery charger or the like) used for charging the battery pack. The electric power source 62 is charged and discharged through the cathode terminal 71 and the anode terminal 72.

[2-2. Electric Vehicle]

Figure 6:
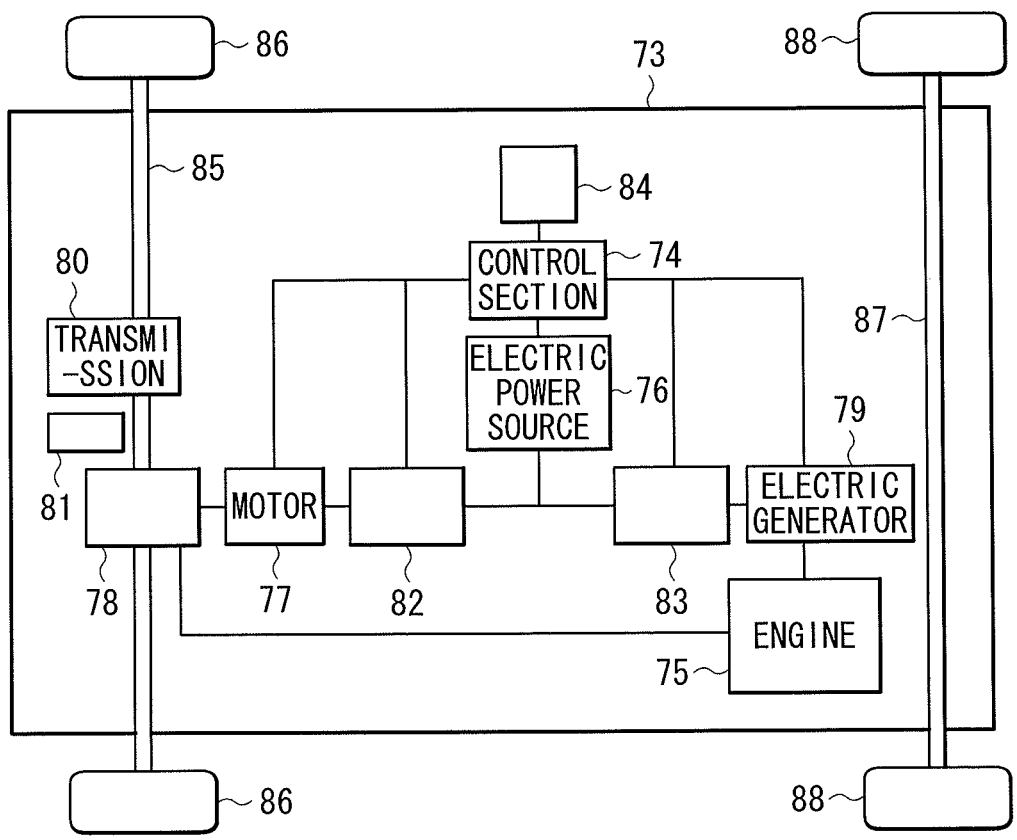
FIG. 6 is a block diagram illustrating a configuration of an application example (electric vehicle) of the secondary battery.

FIG. 6 illustrates a block configuration of a hybrid automobile as an example of electric vehicles. For example, as illustrated in FIG. 6, the electric vehicle includes a control section 74, an engine 75, an electric power source 76, a driving motor 77, a differential 78, an electric generator 79, a transmission 80, a clutch 81, inverters 82 and 83, and various sensors 84 in a housing 73 made of a metal. In addition, the electric vehicle includes, for example, a front drive axis 85 and a front tire 86 that are connected to the differential 78 and the transmission 80, a rear drive axis 87, and a rear tire 88.

The electric vehicle is runnable by using one of the engine 75 and the motor 77 as a drive source. The engine 75 is a main power source, and is, for example, a petrol engine. In the case where the engine 75 is used as a power source, drive power (torque) of the engine 75 is transferred to the front tire 86 or the rear tire 88 through the differential 78, the transmission 80, and the clutch 81 as drive sections, for example. The torque of the engine 75 is also transferred to the electric generator 79. Due to the torque, the electric generator 79 generates alternating-current electric power. The alternating-current electric power is converted to direct-current electric power through the inverter 83, and the converted power is stored in the electric power source 76. Meanwhile, in the case where the motor 77 as a conversion section is used as a drive source, electric power (direct-current electric power) supplied from the electric power source 76 is converted to alternating-current electric power through the inverter 82. The motor 77 is driven by the alternating-current electric power. Drive power (torque) obtained by converting the electric power by the motor 77 is transferred to the front tire 86 or the rear tire 88 through the differential 78, the transmission 80, and the clutch 81 as the drive sections, for example.

It is to be noted that, alternatively, the following mechanism may be adopted. In the mechanism, in the case where speed of the electric vehicle is reduced by an unillustrated brake mechanism, the resistance at the time of speed reduction is transferred to the motor 77 as torque, and the motor 77 generates alternating-current electric power by the torque. It is preferable that the alternating-current electric power be converted to direct-current electric power through the inverter 82, and the direct-current regenerative electric power be stored in the electric power source 76.

The control section 74 controls operation of the whole electric vehicle, and, for example, includes a CPU and the like. The electric power source 76 includes one, or two or more secondary batteries (not illustrated). Alternatively, the electric power source 76 may be connected to an external electric power source, and electric power may be stored by receiving the electric power from the external electric power source. The various sensors 84 are used, for example, for controlling the number of revolutions of the engine 75 or controlling opening level of an unillustrated throttle valve (throttle opening level). The various sensors 84 include, for example, a speed sensor, an acceleration sensor, an engine frequency sensor, and the like.

The description has been hereinbefore given of the hybrid automobile as an electric vehicle. However, examples of the electric vehicles may include a vehicle (electric automobile) working by using only the electric power source 76 and the motor 77 without using the engine 75.

[2-3. Electric Power Storage System]

Figure 7:
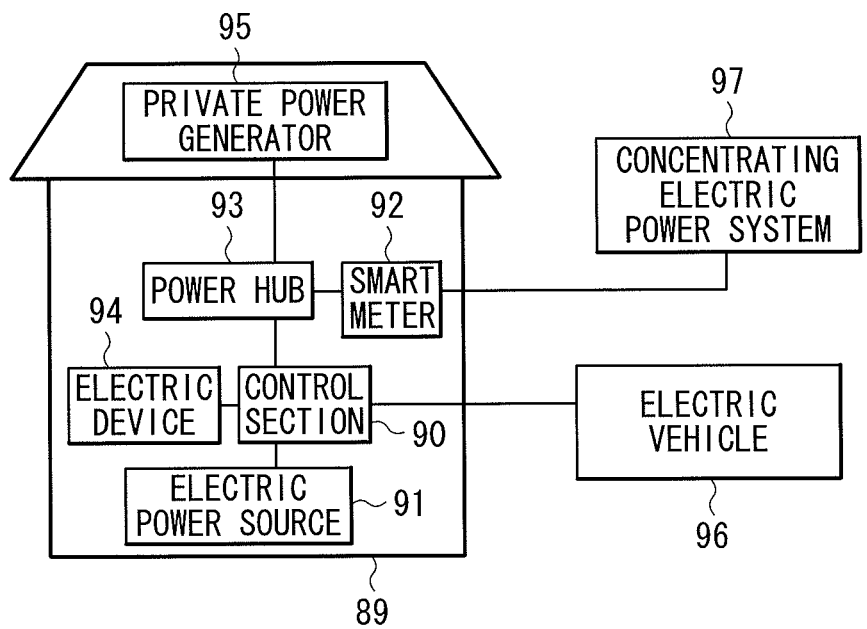
FIG. 7 is a block diagram illustrating a configuration of an application example (electric power storage system) of the secondary battery.

FIG. 7 illustrates a block configuration of an electric power storage system. For example, as illustrated in FIG. 7, the electric power storage system includes a control section 90, an electric power source 91, a smart meter 92, and a power hub 93 inside a house 89 such as a general residence and a commercial building.

In this case, the electric power source 91 is connected to, for example, an electric device 94 arranged inside the house 89, and is connectable to an electric vehicle 96 parked outside the house 89. Further, for example, the electric power source 91 is connected to a private power generator 95 arranged inside the house 89 through the power hub 93, and is connectable to an external concentrating electric power system 97 thorough the smart meter 92 and the power hub 93.

It is to be noted that, the electric device 94 includes, for example, one, or two or more home electric appliances such as a fridge, an air conditioner, a television, and a water heater. The private power generator 95 is one, or two or more of a solar power generator, a wind-power generator, and the like. The electric vehicle 96 is one, or two or more of an electric automobile, an electric motorcycle, a hybrid automobile, and the like. The concentrating electric power system 97 is, for example, one, or two or more of a thermal power plant, an atomic power plant, a hydraulic power plant, a wind-power plant, and the like.

The control section 90 controls operation of the whole electric power storage system (including a usage state of the electric power source 91), and, for example, includes a CPU and the like. The electric power source 91 includes one, or two or more secondary batteries (not illustrated). The smart meter 92 is, for example, an electric power meter compatible with a network arranged in the house 89 demanding electric power, and is communicable with an electric power supplier. Accordingly, for example, while the smart meter 92 communicates with external as needed, the smart meter 92 controls the balance between supply and demand in the house 89 and allows effective and stable energy supply.

In the electric power storage system, for example, electric power is stored in the electric power source 91 from the concentrating electric power system 97 as an external electric power source through the smart meter 92 and the power hub 93, and electric power is stored in the electric power source 91 from the private power generator 95 as an independent electric power source through the power hub 93. As needed, the electric power stored in the electric power source 91 is supplied to the electric device 94 or the electric vehicle 96 according to an instruction of the control section 90. Therefore, the electric device 94 becomes operable, and the electric vehicle 96 becomes chargeable. That is, the electric power storage system is a system capable of storing and supplying electric power in the house 89 by using the electric power source 91.

The electric power stored in the electric power source 91 is arbitrarily usable. Therefore, for example, electric power is allowed to be stored in the electric power source 91 from the concentrating electric power system 97 in the middle of the night when an electric rate is inexpensive, and the electric power stored in the electric power source 91 is allowed to be used during daytime hours when an electric rate is expensive.

The foregoing electric power storage system may be arranged for each household (family unit), or may be arranged for a plurality of households (family units).

[2-4. Electric Power Tool]

Figure 8:
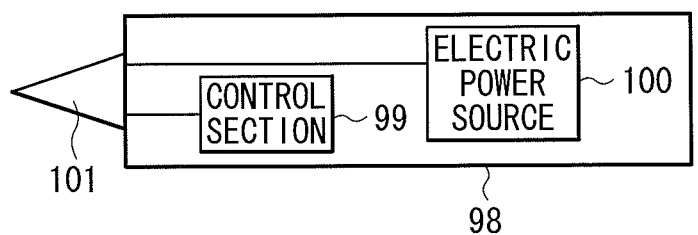
FIG. 8 is a block diagram illustrating a configuration of an application example (electric power tool) of the secondary battery.

FIG. 8 illustrates a block configuration of an electric power tool. For example, as illustrated in FIG. 8, the electric power tool is an electric drill, and includes a control section 99 and an electric power source 100 in a tool body 98 made of a plastic material or the like. For example, a drill section 101 as a movable section is attached to the tool body 98 in an operable (rotatable) manner.

The control section 99 controls operation of the whole electric power tool (including a usage state of the electric power source 100), and includes, for example, a CPU or the like. The electric power source 100 includes one, or two or more secondary batteries (not illustrated). The control section 99 executes control so that electric power is supplied from the electric power source 100 to the drill section 101 as needed according to operation of an unillustrated operation switch to operate the drill section 101.

EXAMPLES

Specific Examples according to the embodiment of the present application will be described in detail.

Examples 1 to 35

The cylindrical type lithium ion secondary battery illustrated in FIG. 1 and FIG. 2 was fabricated by the following procedure.

First, a cathode active material was prepared. First, as illustrated in Table 1 to Table 3, raw material powder of the central portion and the covering portion was prepared. The raw materials of the central portion were $LiCoO_2$ and the like having a bedded salt-type crystal structure, $LiMn_2O_4$ and the like having a spinel-type crystal structure, and $Li_{1.01}FePO_4$ and the like having an olivine-type crystal structure. In the case where a lithium transition metal complex compound including the central portion and the covering portion was formed, the raw materials were weighed to obtain each predetermined amount and mixed. After that, the resultant mixture was treated for 1 hour by using a mechanochemical device, the surface of the central portion was covered with the covering portion ($Mg(OH)_2$) to obtain a pre-fired precursor. Subsequently, the pre-fired precursor was fired. After that, the resultant was kept in a fired state, and was subsequently cooled to obtain the lithium transition metal complex compound. The temperature in firing and the retention time thereof were as illustrated in Table 1 to Table 3. In this case, the rate of temperature increase was 3 deg C. per minute, and the rate of temperature decrease was 5 deg C. per minute. In addition, as needed, the raw materials of the central portion were used as it is as cathode active materials. Average particle diameters of the raw materials of the central portion measured by a laser scattering method and mixture ratios (atom ratios) thereof were as illustrated in Table 1 to Table 3.

Next, the secondary battery was fabricated by using the foregoing cathode active material. In forming the cathode 21, 98 parts by mass of the cathode active material, 1.2 parts by mass of a cathode binder (polyvinylidene fluoride: PVDF), and 0.8 parts by mass of a cathode electric conductor (Ketjen black) were mixed to obtain a cathode mixture. Subsequently, the cathode mixture was dispersed in an organic solvent (N-methyl-2-pyrrolidone: (NMP)) to obtain a paste cathode mixture slurry. Subsequently, both surfaces of the strip-shaped cathode current collector 21A (aluminum foil being 12 μm thick) were coated with the cathode mixture slurry uniformly by using a coating device, which was dried to form the cathode active material layer 21B. Subsequently, the cathode active material layer 21B was compression-molded by using a roll pressing machine.

In forming the anode 22, 95 parts by mass of an anode active material (artificial graphite) and 5 parts by mass of an anode binder (PVDF) were mixed to obtain an anode mixture. Subsequently, the anode mixture was dispersed in an organic solvent (NMP) to obtain a paste anode mixture slurry. Subsequently, both surfaces of the strip-shaped anode current collector 22A (electrolytic copper foil being 15 μm thick) were coated with the anode mixture slurry uniformly by using a coating device, which was dried to form the anode active material layer 22B. Subsequently, the anode active material layer 22B was compression-molded by using a roll pressing machine.

In preparing an electrolytic solution, an electrolyte salt ($LiPF_6$) was dissolved in a solvent (ethylene carbonate (EC) and ethylmethyl carbonate (EMC)). In this case, the composition of the solvent was EC:EMC=50:50 at a weight ratio, and the content of the electrolyte salt with respect to the solvent was 1 mol/dm$^3$(=1 mol/l).

In assembling the secondary battery, the cathode lead 25 made of aluminum was welded to the cathode current collector 21A, and the anode lead 26 made of nickel was welded to the anode current collector 22A. Subsequently, the cathode 21 and the anode 22 were layered with the separator 23 in between and were spirally wound. After that, the winding end section was fixed by using an adhesive tape to form the spirally wound electrode body 20. Subsequently, the center pin 24 was inserted in the center of the spirally wound electrode body 20. Subsequently, while the spirally wound electrode body 20 was sandwiched between the pair of insulating plates 12 and 13, the spirally wound electrode body 20 was contained in the iron battery can 11 plated with nickel. In this case, the end tip of the cathode lead 25 was welded to the safety valve mechanism 15, and the end tip of the anode lead 26 was welded to the battery can 11. Subsequently, the electrolytic solution was injected into the battery can 11 by a depressurization method, and the separator 23 was impregnated with the electrolytic solution. The separator 23 was a microporous polypropylene film (thickness: 25 μm). Finally, at the open end of the battery can 11, the battery cover 14, the safety valve mechanism 15, and the PTC device 16 were fixed by being caulked with the gasket 17. The cylindrical type secondary battery (outer diameter: 18 mm, height: 65 mm) was thereby completed. In forming the secondary battery, Li metal was prevented from being precipitated on the anode 22 at the time of full charge by adjusting the thickness of the cathode active material layer 21B.

The battery capacity characteristics and the cycle characteristics of the secondary battery were examined. Results illustrated in Table 1 to Table 3 were obtained.

In examining the battery capacity characteristics, one cycle of charge and discharge was performed on the secondary battery in the ambient temperature environment (23 deg C.), and the initial capacity (mAh) was measured. As the charge conditions, the charge current was 1.5 A, the charge voltage was 4.35 V, and the charge time was 2.5 hours. As the discharge conditions, the discharge current was 1 A, and the final voltage was 3 V.

In examining the cycle characteristics, one cycle of charge and discharge was performed on the secondary battery in the ambient temperature environment (23 deg C.), and a discharge capacity (mAh) was measured. After that, the secondary battery was further charged and discharged until the total number of the cycles reached 300, and a discharge capacity (mAh) was measured. From these results, capacity retention ratio (%)=(discharge capacity at the 300th cycle/discharge capacity at the first cycle)*100 was calculated. The charge and discharge conditions were similar to those in the case of examining the battery capacity characteristics.

In examining the characteristics of the secondary battery, the absorption edge energies E1 and E2 were determined by the foregoing procedure.

In examining the absorption edge energy E1 of the first absorption edge, the secondary battery that had been charged under the foregoing charge conditions was discharged until the discharge voltage reached 3.0 V. After that, the secondary battery was disassembled, and the cathode 21 was taken out. In this case, in order to prevent alteration or the like of the sample caused by moisture, disassembly work was performed in the inactive gas atmosphere such as Ar or in a dry room with a dew point equal to or less than −50 deg C. Subsequently, the cathode 21 was washed with dimethyl carbonate (DMC) to remove a salt, a solvent, and the like adhered to the surface thereof. Subsequently, the XAFS spectrum in the MgK absorption edge was measured by using a method of measuring the conversion electron intensity as an X-ray absorption spectroscopic method. In this case, the sample was inserted in a measurement device in the inactive gas atmosphere such as Ar for preventing the sample from being exposed to the air, or in the air for suppressing surface alteration for extremely short time (1 minute to 2 minutes).

After the XAFS spectrum was obtained, as described above, a region on the lower energy side than the MgK absorption edge was linearly approximated, and the region on the higher energy side than the MgK absorption edge was quadric-approximated. Thereby, the XAFS spectrum was standardized so that the intensity of the curve became 1 in the energy region in the measurement range. From the standardized XAFS spectrum, the absorption edge energy E1 in which the X-ray absorption intensity was 0.5 in the first absorption edge was obtained.

In examining the absorption edge energy E2 of the second absorption edge, the secondary battery was charged until the voltage reached the charge voltage V illustrated in Table 1 to Table 3 under the foregoing charge conditions. After that, by a procedure similar to that in the case of examining the absorption edge energy E1, the secondary battery in a state of being charged was disassembled and the cathode 21 was taken out, and the XAFS spectrum was measured and standardized. From the standardized XAFS spectrum, the absorption edge energy E2 in which the X-ray absorption intensity was 0.5 in the second absorption edge was obtained.

The measured absorption edge energies E1 and E2 and the difference thereof (E2−E1) were as illustrated in Table 1 to Table 3.

TABLE 1

| Example | Raw material Central portion (average particle diameter: μm) | Raw material Covering portion (atomic ratio) | Firing conditions Temperature (deg C.) | Firing conditions Time (h) | Absorption edge energy (eV) E1 | Absorption edge energy (eV) E2 | Absorption edge energy (eV) E2 − E1 | Charge voltage V (V) | (V − 4.25) × 4 | Initial capacity (Wh) | Capacity retention ratio (%) |
|---|---|---|---|---|---|---|---|---|---|---|---|
| 1 | $LiCoO_2$ (13) | $MgCO_3$ (Co:Mg = 100:1) | 900 | 2 | 1308.4 | 1309.1 | 0.7 | 4.35 | 0.4 | 9.2 | 86 |
| 2 | $LiCoO_2$ (13) | $MgCO_3$ (Co:Mg = 100:1) | 800 | 4 | 1308.2 | 1308.8 | 0.6 | 4.35 | 0.4 | 8.6 | 90 |
| 3 | $LiCoO_2$ (13) | $MgCO_3$ (Co:Mg = 100:5) | 900 | 0.5 | 1308.5 | 1309.1 | 0.6 | 4.35 | 0.4 | 8.9 | 88 |
| 4 | $LiCoO_2$ (3) | $MgCO_3$ (Co:Mg = 100:1) | 900 | 0.5 | 1308.4 | 1309.0 | 0.6 | 4.35 | 0.4 | 8.7 | 91 |
| 5 | $LiCoO_2$ (13) | $MgF_2$ (Co:Mg = 100:1) | 900 | 2 | 1308.7 | 1309.2 | 0.5 | 4.35 | 0.4 | 9.1 | 83 |
| 6 | $LiCoO_2$ (13) | $MgSO_4$ (Co:Mg = 100:1) | 900 | 2 | 1308.9 | 1309.4 | 0.5 | 4.35 | 0.4 | 9.3 | 82 |
| 7 | $LiCo_{0.98}Al_{0.01}Mg_{0.01}O_2$ (12) | $MgCO_3$ (Co:Mg = 100:1) | 900 | 2 | 1308.2 | 1308.7 | 0.5 | 4.35 | 0.4 | 9.1 | 78 |
| 8 | $LiCo_{0.98}Al_{0.01}Mg_{0.01}O_2$ (12) | $Mg_3(PO_4)_2$ (Co:Mg = 100:1) | 900 | 2 | 1308.7 | 1309.3 | 0.6 | 4.35 | 0.4 | 8.8 | 84 |
| 9 | $LiCo_{0.98}Al_{0.01}Mg_{0.01}O_2$ (12) | $Al_3(PO_4)_2$ (Co:Al = 100:1) | 900 | 2 | 1308.6 | 1309.1 | 0.5 | 4.35 | 0.4 | 8.9 | 81 |
| 10 | $LiCo_{0.98}Al_{0.01}Mg_{0.01}O_2$ (12) | $AlF_3$ (Co:Al = 100:1) | 900 | 2 | 1308.3 | 1308.8 | 0.5 | 4.35 | 0.4 | 8.7 | 81 |
| 11 | $LiCo_{0.98}Al_{0.01}Mg_{0.01}O_2$ (12) | $TiF_3$ (Co:Ti = 100:1) | 900 | 2 | 1308.4 | 1308.9 | 0.5 | 4.35 | 0.4 | 8.8 | 80 |
| 12 | $LiCoO_2$ (13) | $MgCO_3$ (Co:Mg = 100:1) | 900 | 2 | 1308.4 | 1308.9 | 0.5 | 4.30 | 0.2 | 8.5 | 91 |

TABLE 2

| Example | Central portion (average particle diameter: μm) | Covering portion (atomic ratio) | Firing conditions Temperature (deg C.) | Firing conditions Time (h) | Absorption edge energy (eV) E1 | Absorption edge energy (eV) E2 | Absorption edge energy (eV) E2 − E1 | Charge voltage V (V) | (V − 4.25) × 4 | Initial capacity (Wh) | Capacity retention ratio (%) |
|---|---|---|---|---|---|---|---|---|---|---|---|
| 13 | $LiNi_{0.5}Co_{0.2}Mg_{0.3}O_2$ (11) | $MgCO_3$ (Ni:Mg = 100:2) | 900 | 2 | 1308.2 | 1308.6 | 0.4 | 4.30 | 0.2 | 8.9 | 85 |
| 14 | $Li_{1.03}Ni_{0.77}Co_{0.20}Al_{0.03}O_2$ (12) | $MgCO_3$ (Ni:Mg = 100:1) | 900 | 2 | 1308.2 | 1308.5 | 0.3 | 4.30 | 0.2 | 9.0 | 88 |
| 15 | $Li_{1.01}FePO_4$ (10) | $MgCO_3$ (Fe:Mg = 100:1) | 900 | 2 | 1307.9 | 1308.3 | 0.4 | 4.30 | 0.2 | 6.9 | 91 |
| 16 | $Li_{1.02}Fe_{0.1}Mn_{0.9}PO_4$ (10) | $MgCO_3$ (Mn:Mg = 100:1) | 900 | 2 | 1307.7 | 1308.0 | 0.3 | 4.30 | 0.2 | 7.7 | 85 |
| 17 | $Li_{1.13}(Mn_{0.6}Ni_{0.2}Co_{0.2})_{0.87}O_2$ (11) | $MgCO_3$ (Mn:Mg = 100:2) | 900 | 2 | 1308.4 | 1308.7 | 0.3 | 4.30 | 0.2 | 8.8 | 81 |
| 18 | $LiMn_2O_4$ (12) | $MgCO_3$ (Mn:Mg = 100:1) | 900 | 2 | 1307.4 | 1307.7 | 0.3 | 4.30 | 0.2 | 8.2 | 81 |
| 19 | $LiMn_{1.8}Ni_{0.2}PO_4$ (11) | $MgCO_3$ (Mn:Mg = 100:1) | 900 | 2 | 1307.6 | 1307.9 | 0.3 | 4.30 | 0.2 | 8.1 | 79 |
| 20 | $LiCoO_2$ (13) | $MgCO_3$ (Co:Mg = 100:1) | 900 | 2 | 1308.4 | 1309.2 | 0.8 | 4.40 | 0.6 | 9.5 | 78 |
| 21 | $LiCoO_2$ (13) | $MgCO_3$ (Co:Mg = 100:1) | 900 | 2 | 1308.4 | 1309.5 | 1.1 | 4.50 | 1.0 | 10.2 | 66 |

TABLE 3

| Example | Central portion (average particle diameter: μm) | Covering portion (atomic ratio) | Firing conditions Temperature (deg C.) | Firing conditions Time (h) | Absorption edge energy (eV) E1 | Absorption edge energy (eV) E2 | Absorption edge energy (eV) E2 − E1 | Charge voltage V (V) | (V − 4.25) × 4 | Initial capacity (Wh) | Capacity retention ratio (%) |
|---|---|---|---|---|---|---|---|---|---|---|---|
| 22 | $LiCoO_2$ (13) | $MgCO_3$ (Co:Mg = 100:1) | 900 | 8 | 1308.6 | 1308.8 | 0.2 | 4.35 | 0.4 | 9.0 | 62 |
| 23 | $LiCoO_2$ (13) | $MgCO_3$ (Co:Mg = 100:5) | 900 | 0.5 | 1308.6 | 1308.8 | 0.2 | 4.35 | 0.4 | 9.0 | 53 |

TABLE 3-continued

| Example | Central portion (average particle diameter: μm) | Covering portion (atomic ratio) | Firing conditions Temperature (deg C.) | Time (h) | Absorption edge energy (eV) E1 | E2 | E2 − E1 | Charge voltage V (V) | (V − 4.25) × 4 | Initial capacity (Wh) | Capacity retention ratio (%) |
|---|---|---|---|---|---|---|---|---|---|---|---|
| 24 | $LiCoO_2$ (3) | $MgCO_3$ (Co:Mg = 100:1) | 900 | 2 | 1308.6 | 1308.6 | 0.1 | 4.35 | 0.4 | 7.5 | 88 |
| 25 | $LiCoO_2$ (13) | $AlF_3$ (Co:Al = 100:2) | 900 | 2 | — | — | — | 4.35 | 0.4 | 8.8 | 45 |
| 26 | $LiCoO_2$ (13) | — | — | — | — | — | — | 4.35 | 0.4 | 9.2 | 47 |
| 27 | $LiCoO_2$ (13) | — | 900 | 2 | — | — | — | 4.35 | 0.4 | 9.2 | 51 |
| 28 | $LiCo_{0.98}Al_{0.01}Mg_{0.01}O_2$ (12) | — | 900 | 2 | 1308.5 | 1308.5 | 0.0 | 4.35 | 0.4 | 9.0 | 68 |
| 29 | $LiNi_{0.5}Co_{0.2}Mn_{0.3}O_2$ (11) | — | 900 | 2 | — | — | — | 4.30 | 0.2 | 8.8 | 49 |
| 30 | $Li_{1.02}Fe_{0.1}Mn_{0.9}PO_4$ (10) | — | 900 | 2 | — | — | — | 4.30 | 0.2 | 7.8 | 44 |
| 31 | $Li_{1.13}(Mn_{0.6}Ni_{0.2}Co_{0.2})_{0.87}O_2$ (11) | — | 900 | 2 | — | — | — | 4.30 | 0.2 | 8.9 | 38 |
| 32 | $LiMn_2O_4$ (12) | — | 900 | 2 | — | — | — | 4.30 | 0.2 | 8.4 | 42 |
| 33 | $LiCoO_2$ (13) | $MgCO_3$ (Co:Mg = 100:1) | 900 | 8 | 1308.8 | 1308.9 | 0.1 | 4.30 | 0.2 | 8.4 | 68 |
| 34 | $LiCoO_2$ (13) | $MgCO_3$ (Co:Mg = 100:1) | 900 | 8 | 1308.6 | 1308.9 | 0.3 | 4.40 | 0.6 | 9.6 | 45 |
| 35 | $LiCoO_2$ (13) | $MgCO_3$ (Co:Mg = 100:1) | 900 | 8 | 1308.6 | 1309.0 | 0.4 | 4.50 | 1.0 | 10.1 | 35 |

In the case where the lithium transition metal complex compound as a cathode active material contained Mg in the vicinity of the surface thereof, the first absorption edge having the absorption edge energy E1 was detected in the region where the X-ray energy was from 1303 eV to 1313 eV both inclusive in the XAFS spectrum measured at the time of discharge.

Further, in the case where the absorption edge energies E1 and E2 and the charge voltage V satisfied the relation of E2−E1≥(V−4.25)×4, both the initial capacity and the capacity retention ratio were increased more than in the case that the absorption edge energies E1 and E2 and the charge voltage V did not satisfy the relation.

The foregoing results show that in the case where the lithium transition metal complex compound contains Mg as a constituent element, the initial capacity and the capacity retention ratio are increased or decreased according to the abundance (distribution state) of Mg in the vicinity of the surface thereof. The foregoing results show that, in this case, in the case where the absorption edge energies E1 and E2 and the charge voltage V satisfy the foregoing relation, the abundance of Mg becomes appropriate in the relation with respect to the charge voltage V, and therefore the initial capacity and the capacity retention ratio are specifically increased.

The present application has been described with reference to the embodiment and Examples. However, the present application is not limited to the examples described in the embodiment and Examples, and various modifications may be made. For example, the secondary battery according to the present application is similarly applicable to a lithium ion secondary battery in which the anode capacity includes a capacity by inserting and extracting lithium ions and a capacity associated with precipitation and dissolution of lithium metal, and the anode capacity is expressed by the sum of these capacities. In this case, the chargeable capacity of an anode material is set to a smaller value than that of the discharge capacity of the cathode.

Further, in the embodiment and Examples, the description has been given of the case using lithium as an element of an electrode reactant substance. However, the element of the electrode reactant substance is not necessarily limited thereto. As an element of electrode reactant substance, for example, other Group 1 element such as Na and K, a Group 2 element such as Mg and Ca, or other light metals such as Al may be used.

Further, in the embodiment and Examples, the description has been given with the specific example in which the battery structure is the cylindrical type or the laminated film type, and with the specific example in which the battery device has the spirally wound structure. However, applicable structures are not limited thereto. The secondary battery according to the present application is similarly applicable to a battery having other battery structure such as a coin type battery, a square type battery, and a button type battery, or a battery in which the battery device has other structure such as a laminated structure.

It is possible to achieve at least the following configurations from the above-described exemplary embodiment and the modifications of the disclosure.

(1) A secondary battery including:
    a cathode;
    an anode; and
    an electrolytic solution, wherein
    the cathode includes a lithium transition metal complex compound including lithium (Li), one, or two or more transition metals, magnesium (Mg), and oxygen (O) as constituent elements,
    in a standardized X-ray absorption spectrum, having a horizontal axis indicating X-ray energy (eV) and a vertical axis indicating X-ray absorption intensity, of the lithium transition metal complex compound measured by an X-ray absorption spectroscopic method,
    a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V,
    a second absorption edge having absorption edge energy E2 in X-ray absorption intensity of about 0.5 exits, in a charged state in which a charge voltage V is from about 4.3 V to about 4.5 V both inclusive, and
    the absorption edge energies E1 and E2 and the charge voltage V satisfy a relation of E2−E1≥(V−4.25)×4.

(2) The secondary battery according to (1), wherein the lithium transition metal complex compound includes magnesium on a surface thereof, or both on the surface thereof and inside thereof (3) The secondary battery according to (1) or (2), wherein
the lithium transition metal complex compound includes a central portion including lithium, one, or two or more transition metals, and oxygen as constituent elements and a covering portion provided on part or all of the central portion, and
the central portion or the covering portion, or both include magnesium as a constituent element.

(4) The secondary battery according to (3), wherein the covering portion includes magnesium as a constituent element.

(5) The secondary battery according to (3) or (4), wherein the central portion includes one or more of compounds represented by Formula (1) to Formula (5) described below, $$Li_{0.9+a}Co_bM1_{1-b}O_2 \quad (1)$$

where M1 represents one or more of Al, Mg, and Ba, and a and b satisfy $0 \leq a \leq 0.2$ and $0 < b \leq 1$, $$Li_{0.9+c}Ni_dCo_{1-d-e}M2_eO_2 \quad (2)$$

where M2 represents one or more of Mg, Al, Mn, and Ba, and c, d, and e satisfy $0 \leq c < 0.2$ and $0 < d+e < 1$, $$Li_{1+f}(Mn_gNi_nCO_{1-g-h})_{1-f}O_2 \quad (3)$$

where f, g, and h satisfy $0.05 \leq f \leq 0.25$, $0.5 \leq g < 0.7$, and $0 \leq h \leq (1-g)$, $$Li_{1+i}M3PO_4 \quad (4)$$

where M3 represents one or more of Fe, Mn, and Co, and i satisfies $0 \leq i \leq 0.1$, $$Li_{0.9+j}Mn_{2-k}M4_kO_4 \quad (5)$$

where M4 represents one or more of Al, Fe, Co, Cu, Cr, and Ni, and j and k satisfy $0 \leq j \leq 0.2$ and $0.5 \leq k < 1$.

(6) The secondary battery according to any one of (3) to (5), wherein the covering portion including magnesium as a constituent element includes one or more of a carbonate, a sulfate, a phosphate, and a halide of magnesium.

(7) The secondary battery according to any one of (1) to (6), wherein the lithium transition metal complex compound includes cobalt as a transition metal.

(8) The secondary battery according to any one of (1) to (7), wherein an upper limit value of the charge voltage is from about 4.2 V to about 4.8 V both inclusive.

(9) The secondary battery according to any one of (1) to (7), wherein an upper limit value of the charge voltage is from about 4.25 V to about 4.8 V both inclusive.

(10) The secondary battery according to any one of (1) to (9), wherein the secondary battery is a lithium ion secondary battery.

(11) A battery pack including:
the secondary battery according to any one of (1) to (10);
a control section controlling a usage state of the secondary battery; and
a switch section switching the usage state of the secondary battery according to an instruction of the control section.

(12) An electric vehicle including:
the secondary battery according to any one of (1) to (10);
a conversion section converting electric power supplied from the secondary battery to drive power;
a drive section operating according to the drive power; and
a control section controlling a usage state of the secondary battery.

(13) An electric power storage system including:
the secondary battery according to any one of (1) to (10);
one, or two or more electric devices; and
a control section controlling supplying of electric power from the secondary battery to the electric device.

(14) An electric power tool including:
the secondary battery according to any one of (1) to (10); and
a movable section being supplied with electric power from the secondary battery.

(15) An electronic device including
the secondary battery according to any one of (1) to (10), wherein
electric power is supplied from the secondary battery to the electronic device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A secondary battery comprising:
a cathode;
an anode; and
an electrolytic solution, wherein
the cathode includes a lithium transition metal complex compound including lithium (Li), one, or two or more transition metals, magnesium (Mg), and oxygen (O) as constituent elements,
in a standardized X-ray absorption spectrum, having a horizontal axis indicating X-ray energy (eV) and a vertical axis indicating X-ray absorption intensity, of the lithium transition metal complex compound measured by an X-ray absorption spectroscopic method,
a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V,
a second absorption edge having absorption edge energy E2 in X-ray absorption intensity of about 0.5 exits, in a charged state in which a charge voltage V is from about 4.3 V to about 4.5 V both inclusive, and
the absorption edge energies E1 and E2 and the charge voltage V satisfy a relation of $E2-E1 \geq (V-4.25) \times 4$.

2. The secondary battery according to claim 1, wherein the lithium transition metal complex compound includes magnesium on a surface thereof, or both on the surface thereof and inside thereof.

3. The secondary battery according to claim 1, wherein
the lithium transition metal complex compound includes a central portion including lithium, one, or two or more transition metals, and oxygen as constituent elements and a covering portion provided on part or all of the central portion, and
the central portion or the covering portion, or both include magnesium as a constituent element.

4. The secondary battery according to claim 3, wherein the covering portion includes magnesium as a constituent element.

5. The secondary battery according to claim 3, wherein the central portion includes one or more of compounds represented by Formula (1) to Formula (5) described below, $$Li_{0.9+a}Co_bM1_{1-b}O_2 \quad (1)$$

where M1 represents one or more of Al, Mg, and Ba, and a and b satisfy $0 \leq a \leq 0.2$ and $0 < b \leq 1$, $$Li_{0.9+c}Ni_dCo_{1-d-e}M2_eO_2 \quad (2)$$

where M2 represents one or more of Mg, Al, Mn, and Ba, and c, d, and e satisfy 0≤c<0.2 and 0<d+e<1, $$Li_{1+f}(Mn_gNi_hCo_{1-g-h})_{1-f}O_2 \quad (3)$$

where f, g, and h satisfy 0.05≤f<0.25, 0.5≤g<0.7, and 0≤h≤ (1−g), $$Li_{1+i}M3PO_4 \quad (4)$$

where M3 represents one or more of Fe, Mn, and Co, and i satisfies 0≤i≤0.1, $$Li_{0.9+j}Mn_{2-k}M4_kO_4 \quad (5)$$

where M4 represents one or more of Al, Fe, Co, Cu, Cr, and Ni, and j and k satisfy 0≤j≤0.2 and 0.5≤k<1.

6. The secondary battery according to claim 3, wherein the covering portion including magnesium as a constituent element includes one or more of a carbonate, a sulfate, a phosphate, and a halide of magnesium.

7. The secondary battery according to claim 1, wherein the lithium transition metal complex compound includes cobalt as a transition metal.

8. The secondary battery according to claim 1, wherein an upper limit value of the charge voltage is from about 4.2 V to about 4.8 V both inclusive.

9. The secondary battery according to claim 1, wherein an upper limit value of the charge voltage is from about 4.25 V to about 4.8 V both inclusive.

10. The secondary battery according to claim 1, wherein the secondary battery is a lithium ion secondary battery.

11. A battery pack comprising:
a secondary battery;
a control section controlling a usage state of the secondary battery; and
a switch section switching the usage state of the secondary battery according to an instruction of the control section, wherein
the secondary battery includes a cathode, an anode, and an electrolytic solution,
the cathode includes a lithium transition metal complex compound including lithium (Li), one, or two or more transition metals, magnesium (Mg), and oxygen (O) as constituent elements,
in a standardized X-ray absorption spectrum, having a horizontal axis indicating X-ray energy (eV) and a vertical axis indicating X-ray absorption intensity, of the lithium transition metal complex compound measured by an X-ray absorption spectroscopic method,
a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V,
a second absorption edge having absorption edge energy E2 in X-ray absorption intensity of about 0.5 exits, in a charged state in which a charge voltage V is from about 4.3 V to about 4.5 V both inclusive, and
the absorption edge energies E1 and E2 and the charge voltage V satisfy a relation of E2−E1≥(V−4.25)×4.

12. An electric vehicle comprising:
a secondary battery;
a conversion section converting electric power supplied from the secondary battery to drive power;
a drive section operating according to the drive power; and
a control section controlling a usage state of the secondary battery, wherein
the secondary battery includes a cathode, an anode, and an electrolytic solution,
the cathode includes a lithium transition metal complex compound including lithium (Li), one, or two or more transition metals, magnesium (Mg), and oxygen (O) as constituent elements,
in a standardized X-ray absorption spectrum, having a horizontal axis indicating X-ray energy (eV) and a vertical axis indicating X-ray absorption intensity, of the lithium transition metal complex compound measured by an X-ray absorption spectroscopic method,
a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V,
a second absorption edge having absorption edge energy E2 in X-ray absorption intensity of about 0.5 exits, in a charged state in which a charge voltage V is from about 4.3 V to about 4.5 V both inclusive, and
the absorption edge energies E1 and E2 and the charge voltage V satisfy a relation of E2−E1≥(V−4.25)×4.

13. An electric power storage system comprising:
a secondary battery;
one, or two or more electric devices; and
a control section controlling supplying of electric power from the secondary battery to the electric device, wherein
the secondary battery includes a cathode, an anode, and an electrolytic solution,
the cathode includes a lithium transition metal complex compound including lithium (Li), one, or two or more transition metals, magnesium (Mg), and oxygen (O) as constituent elements,
in a standardized X-ray absorption spectrum, having a horizontal axis indicating X-ray energy (eV) and a vertical axis indicating X-ray absorption intensity, of the lithium transition metal complex compound measured by an X-ray absorption spectroscopic method,
a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V,
a second absorption edge having absorption edge energy E2 in X-ray absorption intensity of about 0.5 exits, in a charged state in which a charge voltage V is from about 4.3 V to about 4.5 V both inclusive, and
the absorption edge energies E1 and E2 and the charge voltage V satisfy a relation of E2−E1≥(V−4.25)×4.

14. An electric power tool comprising:
a secondary battery; and
a movable section being supplied with electric power from the secondary battery, wherein
the secondary battery includes a cathode, an anode, and an electrolytic solution,
the cathode includes a lithium transition metal complex compound including lithium (Li), one, or two or more transition metals, magnesium (Mg), and oxygen (O) as constituent elements,
in a standardized X-ray absorption spectrum, having a horizontal axis indicating X-ray energy (eV) and a vertical axis indicating X-ray absorption intensity, of the lithium transition metal complex compound measured by an X-ray absorption spectroscopic method,
a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, a second absorption edge having absorption edge energy E2 in X-ray absorption intensity of about 0.5 exits, in a charged state in which a charge voltage V is from about 4.3 V to about 4.5 V both inclusive, and the absorption edge energies E1 and E2 and the charge voltage V satisfy a relation of E2−E1≥(V−4.25)×4.

15. An electronic device comprising:
a secondary battery as an electric power supply source, wherein
the secondary battery includes a cathode, an anode, and an electrolytic solution,
the cathode includes a lithium transition metal complex compound including lithium (Li), one, or two or more transition metals, magnesium (Mg), and oxygen (O) as constituent elements,
in a standardized X-ray absorption spectrum, having a horizontal axis indicating X-ray energy (eV) and a vertical axis indicating X-ray absorption intensity, of the lithium transition metal complex compound measured by an X-ray absorption spectroscopic method, a first absorption edge having absorption edge energy E1 in X-ray absorption intensity of about 0.5 exits in a range where X-ray energy is from about 1303 eV to about 1313 eV both inclusive, in a discharged state in which a discharge voltage is about 3.0 V, a second absorption edge having absorption edge energy E2 in X-ray absorption intensity of about 0.5 exits, in a charged state in which a charge voltage V is from about 4.3 V to about 4.5 V both inclusive, and the absorption edge energies E1 and E2 and the charge voltage V satisfy a relation of E2−E1≥(V−4.25)×4.

* * * * *